United States Patent Office 3,455,985
Patented July 15, 1969

3,455,985
2-(α-AMINO-LOWER ALKANOYL-
AMINO)BENZOPHENONES
Leo Henryk Sternbach, Upper Montclair, N.J., Gabriel Saucy, Riehen, Switzerland, George Sidney Sach, Upton Wirral, England, and Arthur Stempel, Teaneck, N.J., assignors to Hoffmann-La Roche Inc., Nutley, N.J., a corporation of New Jersey
No Drawing. Continuation-in-part of application Ser. No. 96,663, Mar. 20, 1961. This application Mar. 5, 1962, Ser. No. 177,232
Claims priority, application Germany, June 16, 1961, H 42,866
Int. Cl. C07c 103/18, 103/30
U.S. Cl. 260—465                                                    16 Claims

ABSTRACT OF THE DISCLOSURE

2 - (α - amino-lower alkanoyl-amino)benzophenones which have anticonvulsant, muscle relaxant and sedative activities and which also posses utility as chemical intermediates in the production of 5-phenyl-3H-1,4-benzodiazepin-2(1H)-ones, which in turn have anticonvulsant, muscle relaxant and sedative properties and also have utility as chemical intermediates.

---

This application is a continuation-in-part of our application Ser. No. 96,663, filed Mar. 20, 1961, now abandoned.

This invention relates to new chemical compounds, processes of making them, and processes of converting them to other chemical compounds. These compounds can be designated as 2 - (α - amino-lower alkanoyls-amino)benzophenones. The benzophenone compounds within the scope of the invention can contain, on either benzene ring, one or more substituents selected from a group consisting of halogen, lower alkyl, lower alkoxy, hydroxy, nitro, cyano, trifluoromethyl, lower alkylthio, and mercapto. Also either nitrogen atom of the α-amino-lower alkanoyl-amido moiety can be substituted by lower alkyl groups. The substituted and unsubstituted 2-(amino-lower alkanol-amino)benzophenones are basic in character and form salts; e.g. acid addition salts and quaternary salts. These salts are also part of the invention.

More specifically the compounds of this invention are of the formula

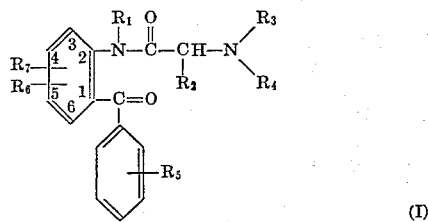

(I)

wherein $R_1$, $R_2$, $R_3$ and $R_4$ are the same or different and are chosen from the group consisting of hydrogen and lower alkyl; $R_5$, $R_6$ and $R_7$ are the same or different and are chosen from the group consisting of hydrogen, halogen, lower alkyl, lower alkoxy, hydroxy, nitro, cyano, trifluoromethyl, lower alkyl-thio and mercapto. Preferred are those compounds, corresponding to the above formula, wherein $R_3$ and $R_4$ are hydrogen. Especially preferred are those wherein at least one of $R_6$ and $R_7$ is other than hydrogen and is in the 5-position.

As stated above, the compounds of the invention, i.e. the compounds of the above formula, are basic, and form salts. These compounds form both addition salts with inorganic and organic acids such as hydrochloric, hydrobromic, sulfuric, phosphoric, tartaric, picric, nitric, succinic, maleic, toluenesulfonic acids and the like, and where, in Formula I above, $R_3$ and $R_4$ are lower alkyl quaternary salts with quaternizing agents such as lower alkyl halides, sulfates and sulfonates, e.g. methyl bromide, methyl sulfate, methyl p-toluenesulfonate; aralkyl halides, e.g. benzyl chloride, benzyl bromide; and the like. These salts are included in the invention.

Lower alkyl as used in this disclosure refers to straight and branched chain lower alkyl groups such as methyl, ethyl, propyl, isopropyl and the like. Lower alkoxy refers to straight and branched chain groups such as methoxy, ethoxy, propoxy, isopropoxy and the like. The term halogen includes all 4 halogens, i.e. iodine, bromine, chlorine and fluorine. The term "lower alkanoyl" refers to such acyl groups as acetyl, propionyl and the like and, accordingly, the term α-halo-lower alkanoyl refers to such moieties as chloroacetyl, bromoacetyl, α-chloropropionyl, α-bromopropionyl and the like.

The 2-(α-amino-lower alkanoyl-amino)benzophenones of this invention possess utility in the field of medicinals. They can be administered internally, for example orally or parenterally, and can be administered in any conventional pharmaceutical form, for example, as solutions, suspensions, capsules, tablets, suppositories, and the like. They have anticonvulsant, muscle relaxant and sedative activities, and can be used as anticonvulsants and tranquilizers. These compounds also possess utility as chemical intermediates in the production of 5-phenyl-3H-1,4-benzodiazepin-2(1H)-ones, which in turn have utility as medicinal agents, having anticonvulsant, muscle relaxant and sedative properties and, further, also have utility as chemical intermediates. Of course, when the intended use of the 2 - (α - amino - lower alkanoylamino)benzophenones of the invention is as medicinal agents, then it is preferred that such compounds be used as the bases or pharmaceutically acceptable acid addition salt thereof or pharmaceutically acceptable quaternary ammonium salt thereof. Also it is readily apparent that if the intended use of the compound is a chemical intermediate, and it is to be used in its salt form, that the particular salt used need not be pharmaceutically acceptable.

Though the compounds of this invention are described above as 2-(α-amino-lower alkanoyl-amino)benzophenones, it is readily apparent that they can be named as 2 - (glycylamino)benzophenones, 2-(α-alkyl-glyclamino)benzophenones, 2-benzoyl-phenylcarbamoyl-lower alkylamines, or 2-amino-2'-benzoyl-lower alkanoyl anilides. Thus, for example a compound of the following formula

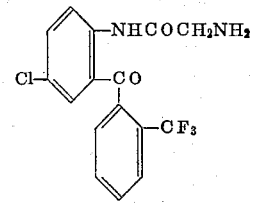

which is one of the compounds included within the invention, can be designated by any of the following names:

2-(aminoacetamido)-5-chloro-2'-(trifluoromethyl)benzophenone
2-glycylamino-5-chloro-2'-(trifluoromethyl)benzophenone
4-chloro-2-(2-trifluoromethylbenzoyl)phenylcarbamoyl-methylamine
2-amino-4'-chloro-2'-(2-trifluoromethylbenzoyl)acetanilide.

The compounds of this invention, represented by Formula I, supra, can be prepared from 2-aminobenzophenones by haloacetylation followed by replacement of the halogen by an amino group. Thus, for example, one method of proparing the 2-(α-amino-lower alkanoyl-amino)- benzophenones of the invention is to react a 2-aminobenzophenone with an α-halo-lower alkanoyl-halide, to subsequently react the 2-(α-halo-lower alkanoyl-amino)benzophenone so obtained with a compounds selected from the group consisting of ammonia, lower alkyl-amines, and di-lower alkyl-amines, and then to isolate the 2(α-amino-lower alkanoyl-amino)benzophenone so produced. The haloacetylating agent referred to herein ah an α-halo-lower alkanoyl-halide) can be any conventional haloacetylation agent such as chloroacetylchloride, bromoacetyl bromide, α-chloropropionylchloride, and the like, but especially preferred are haloacetylation agents containing bromine as the halogen, for exampde, bromoacetylbromide or bromoacetylchloride.

The second step (i.e. the replacement with an amino group) in the process described above can be performed in a variety of ways under differing conditions. These various techniques are illustrated in detail in the examples in fra. Broadly considered the replacement with a primary amino group, here discussed as exemplary, can be denoted as temperature dependent. This in no sense means that there is any temperature above or below which the reaction will not proceed. Thus, as a general rule the reaction of a 2-(α-halo-lower alkanoylamino)benzophenone with ammonia to produce a 2-(α-amino-lower alkanoyl-amine) benzophenone is conducted in a solvent at room temperture. This is obviously most convenient from a manipulative standpoint. However, in certain cases, as illustrated in the examples infra, it has been found advantageous to conduct the reaction at lower temperatures. An expedient for doing this is to use pure liquid ammonia as the reactant in the absence of a solvent. When the reaction is conducted at atmospheric pressure this predetermines the reaction temperature at a maximum of −33° C., the boiling point of ammonia. When the reaction is conducted at temperatures higher than −33° C., for example at room temperature, a great variety of solvents can suitably be used as reaction media. These solvents are illustrated in the examples infra. The choice of a particular solvent is principally a matter of convenience, i.e. cost, availability, the solubility therein of the specific 2-(α-halo-lower alkanoyl-amino)benzophenone being reacted and the stability of the products in the solvents. Dimethylformamide, ether, tetrahydrofuran, dioxane, and methanol are exemplary of the solvents herein used. However, as obvious to those skilled in the art, other solvents can be used.

As stated above the 2-(α-amino-lower alkanoyl-amino) benzophenones of the invention are useful chemical intermediates for the production of 5-phenyl-3H-1,4-benzodiazepin-2(1H)-ones. (hereinafter referred to as benzodiazepinones). This method of preparing benzodiazepinones is also part of the invention. The production of the benzodiazepinones is effected by cyclizing a 2-(α-amino-lower alkanoyl-amino)benzophenone of the formula

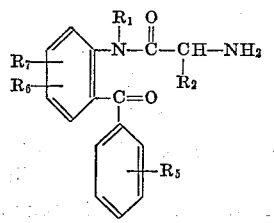

to the corresponding benzodiazepinone of the formula

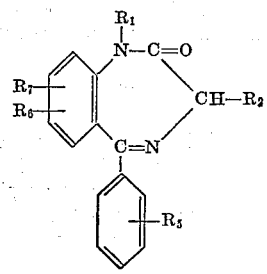

wherein $R_1$, $R_2$, $R_5$, $R_6$ and $R_7$ have the same meaning as given above. As can be seen from the respective formulas the cyclization comprises dehydration of the benzophenone compound. The dehydration can be effected by heating the benzophenone compound. It can be heated either int he absence of a solvent or in the presence of a solvent. In the alternative, the dehydration can be effected by mixing the benzophenone with a solvent, and letting the solution stand. Numerous different solvents can be used and chloroform, pyridine and dimethylformamide can be named as illustrative. Other solvents will be obvious to those skilled in the art.

The following examples are illustrative of the methods and products of this invention. All temperatures are in the centigrade scale. The 2-aminobenzophenones, their precursors and their haloacetylated derivatives, used as intermediates in the following examples, as well as the benzodiazepinones referred to above, are not a part of this invention but are included for completeness of disclosure.

EXAMPLE 1

80 g. of sodium nitrite were added slowly with stirring to 460 ml. of concentrated sulfuric acid. After heating to 70°, a clear solution was obtained. This solution was cooled and 200 g. of 2-chloro-5-trifluoromethyl-aniline were slowly added at a temperature between 10° and 20°. The reaction mixture was stirred for one hour at 20° and then poured onto a mixture of 200 g. of sodium chloride and 1.6 kg. of ice. Excess sodium chloride was filtered off. A solution of 280 g. of zinc chloride in 300 ml. of water was added to the filtrate whereupon a zinc chloride double salt of the corresponding diazonium compound precipitated. After standing overnight at 0°, the double salt was filtered off and washed with a cold saturated salt solution.

To a solution of 120 g. of sodium cyanide and 72 g. of cuprous cyanide in 300 ml. of water were added with stirring and cooling with ice, 291 g. of the wet zinc chloride double salt. After the addition of 24 g. of sodium carbonate, the mixture was first stirred for one hour at 20° and then at 70° for an additional ½ hour. The reaction mixture was cooled and extracted with ether to obtain crude 2-chloro-5-trifluoromethylbenzonitrile. The product was purified by steam distillation and crystallization of the oragnic part of the distillate from hexane to give the pure compound, M.P. 39–40°.

EXAMPLE 2

To a solution of phenyl magnesium bromide, prepared from 9.5 g. of magnesium, 58.5 g. of bromobenzene and 500 ml. of anhydrous ether, was added with stirring a solution of 39 g. of 2-chloro-5-trifluoromethylbenzonitrile in 200 ml. of benzene. 400 ml. of solvent were distilled off and the reaction mixture was then then refluxed for 16 hours. The Grignard complex was decomposed with 40 g. of ammonium chloride and 200 g. of ice and the mixture then extracted with benzene. 2-chloro-5-trifluoromethylbenzophenone imine hydrochloride was precipitated from the benzene solution by the addition of 40 ml. of concentrated hydrochloric acid. The product was filtered off, washed with benzene and dried in vacuo, M.P. 248–251°.

EXAMPLE 3

60 g. of 2-chloro-5-trifluoromethylbenzophenone imine hydrochloride were refluxed overnight with a mixture of 300 ml. of toluene and 300 ml. of 50 percent (by weight) sulfuric acid while stirring. The toluene layer was separated, washed with water, dried, concentrated in vacuo and the residue crystallized from hexane to yield pure 2-chloro-5-trifluoromethylbenzophenone, M.P. 39–40°.

EXAMPLE 4

50 g. of 2-chloro-5-trifluoromethylbenzophenone and 500 ml. of concentrated aqueous ammonia were reacted in a closed vessel for 10 hours at 140° in the presence of 10 g. of cuprous chloride catalyst. The reaction product was extracted with ether. The ether extract was concentrated in vacuo, the residue dissolved in hexane and purified by chromatography using a 10 fold amount of neutral aluminum (Brockmann activity state II). Elution with a hexane-ether mixture (1:1) and evaporation of the solvent gave 2-amino-5-trifluoromethylbenzophenone which, when recrystallized from hexane, formed yellow crystals melting at 81–82°.

EXAMPLE 5

26.5 g. of 2-amino-5-trifluoromethyl-benzophenone were dissolved in 250 ml. of anhydrous ether and 7.9 ml. of pyridine. The resulting solution was stirred and cooled to 0° and then treated over a period of 30 minutes with a solution of 23.2 g. of bromoacethylbromide in 50 ml. of anhydrous ether. After stirring for another half hour at 0°, the resulting suspension was stirred for 3 hours at room temperature and treated with water. The ether layer was separated and concentrated in vacuo yielding 39.2 g. of an oil. Crystallization from 60 ml. of benzene and 90 ml. of hexane afforded a first crop of 2-bromoacetamido-5-trifluoromethyl-benzophenone in the form of needles. From the mother liquor, a second crop could be obtained. Recrystallization from benzene-hexane gave an analytical sample, melting at 103—104°.

EXAMPLE 6

5.0 g. of 2-bromoacetamido-5-trifluoromethyl-benzophenone were dissolved in 150 ml. of anhydrous ether and added over a period of 1 hour with stirring to 50 ml. of liquid ammonia. The resulting solution was stirred for 5 hours at the reflux temperature of ammonia, a Dry-Ice-acetone condenser being used. This was then replaced with a conventional water-condenser and the ammonia allowed to distill off overnight. The resulting suspension, after standing for 5 days at room temperature, was treated with water, the ether separated and then concentrated in vacuo to give crude 2-aminoacetamido-5-trifluoromethylbenzophenone. Crystallization from 6 ml. of benzene and 15 ml. of hexane gave a pure product, melting at 97–99°.

EXAMPLE 7

1.0 g. of 2-amimoacetamido-5-trifluoromethyl-benzophenone in 10 ml. of pyridine was refluxed for two hours. Evaporation of the solvent and crystallization of the residue from benzene-hexane gave colorless prisms of 5-phenyl-7-trifluoromethyl-3H-1,4-benzodiazepin - 2(1H)-one, melting at 205–206°.

EXAMPLE 8

100.0 g. of 2-chloro-5-trifluorometyhl-benzonitrile was stirred and refluxed for one hour in a solution prepared from 200 g. of sodium hydroxide and 400 ml. of water. After cooling, the suspension was diluted with 2 l. of water and extracted with ether, the ether extract was discarded. The aqueous alkaline layer was then acidified (Congo-red) with sulfuric acid and extracted with ether. After concentration a crude, solid material was obtained. This was heated with 300 ml. of hexane to 60° for 10 minutes and then cooled to 0°. After filtration on a suction funnel, 2-chloro-5-trifluoromethylbenzoic acid was obtained. Recrystallization from hexane gave an analytically pure sample as colorless plates melting at 93–94°.

EXAMPLE 9

A mixture of 100.0 g. of 2-chloro-5-trifluoromethyl-benzoic acid and 340 ml. of thionyl chloride was stirred and refluxed for 4 hours. After evaporation of the reagent in vacuo, the crude 2-chloro-5-trifluoromethyl-benzoic acid chloride was fractioned in vacuo, using a 15 cm. Vigreux column, B.P. 59–61°/1 mm. (colorless liquid).

EXAMPLE 10

First, a solution of o-trifluoromethyl-phenyl magnesium bromide was prepared in the usual way using 13.5 g. of magnesium turnings, 255.0 ml. of anhydrous ether and 122.5 g. of o-bromo-benzotrifluoride. Then, over a period of 30 minutes, a solution of 120.0 g. of 2-chloro-5-trifluoromethyl-benzoic acid chloride in 1 l. of benzene was added with stirring at 20° to the Grignard solution. After stirring for an additional 30 minutes at 20°, the ether was distilled off until the distillation temperature reached 78°. The reaction mixture was then refluxed for 3 hours. It was left at room temperature overnight and was then poured over a mixture of 100 g. of ammonium chloride and 500 g. of ice. After standing for 1 hour, it was extracted with ether. The ether layers were washed with water, 3 N sodium hydroxide, and again with water. Evaporation of the solvent in vacuo, after drying over sodium sulfate, yielded an oil, which was purified in 2 portions by chromatography on a total of 2.4 kg. of aluminum oxide (activity grade II). Elution with hexane (25.4 l. total) and ether-hexane (9:1)—and (4:1)—mixture (6 l. total) yielded 2-chloro-2',5-bis-(trifluoromethyl)-benzophenone. Crystallization from hexane gave an analytically pure sample (colorless needles) melting at 49–50°.

EXAMPLE 11

A mixture consisting of 50.0 g. of 2-chloro-2',5-bis-(trifluoromethyl)-benzophenone, 300 ml. of dioxane, 300 ml. of concentrated ammonium hydroxide (58 percent NH$_4$OH, corresponding to 28–30 percent NH$_3$) and 5 g. of cuprous chloride was heated to 140° for 10 hours in an autoclave. The reaction mixture was extracted with ether, which after evaporation, yielded an oil. This was purified as follows: The crude reaction product was dissolved in 800 ml. of hexane, filtered through cotton into a 2 l. Erlenmeyer flask, placed in an ice-bath. 200 ml. of 50 percent (by weight) sulfuric acid were added and the mixture allowed to stir for 30 minutes. This caused a voluminous precipitation of the sulfate of the amine which was collected with suction on a sintered glass funnel. The solid sulfate thus obtained was introduced into 200 ml. of 3 N sodium hydroxide. The free amine was extracted with ether and on evaporation an oil was obtained, which was further purified by dissolving it in 500 ml. of hexane and filtering the solution through 50 g. of aluminum oxide (activity grade I). The column was washed 3 times with 100 ml. of hexane each. The hexane eluants were combined, concentrated to about 80 ml. and kept overnight at 0°. Light yellow prisms of 2-amino-2',5-bis-(trifluoromethyl)-benzophenone were obtained. Recrystallization from hexane gave an analytically pure sample melting at 76–78°.

EXAMPLE 12

11.64 g. of 2-amino-2',5-bis-(trifluoromethyl)-benzophenone dissolved in 56 ml. of anhydrous ether and 2.84 ml. of pyridine, were treated at 0° with 3.0 ml. of bromoacetyl bromide. The reaction mixture was stirred for one hour at 0° and for 3 hours at 25°, then without isolating the bromoacetamido derivative, 50 ml. of liquid ammonia were introduced, using a Dry Ice-acetone condenser. After stirring for 3 hours at the reflux temperature of liquid ammonia, the Dry Ice condenser was replaced with a conventional condenser and the ammonia allowed to evaporate overnight. To the residue ether and water were added. The ether layer was separated and yielded after evaporation a crude, oily reaction product. This was dissolved in a mixture of 50 ml. of benzene and 50 ml. of hexane and chromatographed on 280 g. of aluminum oxide (activity grade III). Starting material was regenerated using 900 ml. of a benzene-hexane-(1:1)-mixture as eluant. Then, with pure benzene, followed with ether, 2-aminoacetamido - 2',5-bis(trifluoromethyl)-benzophenone was eluted. Crystallization from benzene-hexane and recrystallization from benzene-hexane gave the pure product as slightly yellow, cubic prisms, melting at 108–109°.

EXAMPLE 13

3.33 g. of 2-aminoacetamido-2′,5-bis-(trifluoromethyl)-benzophenone was heated in an open tube for 30 minutes, using an oil bath at 210°. (The temperature of the reacting material was about 203–205°.) At the beginning, the molten material bubbled strongly, due to the water split off during dehydration. The gas evolution had almost completely stopped after 30 minutes. Upon cooling, a glass was obtained. This was dissolved in warm benzene and chomatographed on 100 g. of aluminum (activity grade III). Elution with 300 ml. of benzene gave an oil, which was discarded. Elution with a benzene-ether mixture (1:1) yielded an oily material, which crystallized readily upon addition of a few drops of benzene. It was further purified by dissolving in ether and extracting the unchanged starting material with 1 N hydrochloric acid. The ether-extract was then crystallized from a small amount of ether to give 2′,5-bis-(trifluoromethyl)-1,4-benzodiazepin-2(1H)-one. An analytical sample, prepared by recrystallization from benzene-hexane, melted at 226–227° (colorless plates).

EXAMPLE 14

A solution of o-trifluoromethyl phenyl magnesium bromide was prepared in the usual manner from 50.0 g. of o-bromo-benzotrifluoride, 5.55 g. of magnesium and 110 ml. of anhydrous ether. This solution was added with stirring at 20° over a period of 3 hours to a solution of 33.0 g. of 2-methyl-4H-3,1-benzoxazin-4-one in 300 ml. of methylene chloride. The resulting dark but clear solution was left at room temperature for 16 hours and was then poured over a mixture of 50 g. of ammonia chloride and 600 g. of crushed ice. Extraction with ether gave a crude reaction product which was directly hydrolyzed by refluxing for one hour in a mixture of 240 ml. of ethanol and 240 ml. of 3 N sodium hydroxide. After standing overnight, the reaction mixture was extracted with ether. The ether layer was washed with water and concentrated in vacuo yielding an oil. This was purified in two portions by chromatography on the 20-fold amount of neutral alumina (activity grade III; i.e. containing 60 percent of water). Elution with petroleum ether (60–70°) and a mixture of petroleum ether (60–70°) and ether (9:1) followed by crystallization from a mixture of ether and hexane yielded 2-amino-2′-trifluoromethylbenzophenone melting at 94–96° (yellow prisms).

EXAMPLE 15

To a solution of 5.0 g. of 2-amino-2′-trifluoromethyl-benzophenone in 25 ml. of anhydrous ether, cooled to 0°, 1.7 ml. of bromoacetyl bromide was added with stirring; a precipitation occurred and the yellow color of the solution gradually faded. The suspension containing 2-bromo-acetamido-2′-trifluoromethylbenzophenone was stirred for half an hour at 0° and for two hours at room temperature. After that, 25 ml. of liquid ammonia was condensed into the flask, by introducing ammonia gas and using an efficient Dry Ice-acetone condenser. The resulting mixture was stirred and refluxed (B.P. of liquid ammonia) for 3 hours. After taking off the condenser, the ammonia was allowed to evaporate overnight. The reaction mixture was extracted with ether (the ether layers being washed 3 times with water) and yielded crude 2-aminoacetamido - 2′ - trifluoromethylbenzophenone. Recrystallization from a mixture of 15 ml. of benzene and 15 ml. of hexane gave the pure product, melting at 141–142° (colorless, rhombic plates).

EXAMPLE 16

3.0 g. of 2-aminoacetamido-2′-trifluoromethylbenzophenone was heated in an open tube for 15 minutes to 200–205°, using an oil bath. Water was given off. On cooling, a brown glass was obtained which, on crystallization from a mixture of methanol and ether, gave crude 5-(2-trifluoromethylphenyl) - 3H - 1,4 - benzodiazepin - 2(1H)-one. The mother liquor was evaporated to dryness, dissolved in benzene and chromatographed on 60 g. of neutral alumina (activity grade III, i.e. containing 6 percent of water). Elution with benzene (300 ml.) yielded some starting material. Then, with a benzene-ether-(1:1)-mixture (400 ml.), the crude reaction product could be eluted. This, on crystallization from ether-hexane, gave the pure 5-(2-trifluoromethylphenyl)-3H-1,4-benzodiazepin-2(1H)-one, melting at 187–188° (almost colorless prisms).

EXAMPLE 17

20.0 g. of 2 - chloro - 5 - trifluoromethylbenzophenone were dissolved in 300 ml. of a saturated (at 20°) methylamine solution in methanol. 10.0 g. of cuprous chloride were added and the resulting mixture heated to 140° for a period of 10 hours in an autoclave. The resulting reaction mixture was concentrated in vacuo to about 100 ml. diluted with water, and extracted with ether. The ether extract yielded after concentration 18.4 g. of an oil which was dissolved in hexane and purified by chromatography on 400 g. of alumina (Woelm, grade III). The elution was carried out first with four 400 ml. fractions of hexane. The next three fractions (400 ml. each) were obtained using a hexane-ether mixture (9:1) as the eluant.

Fraction (1) of the chromatogram, upon crystallization from ether-hexane, gave $\alpha,\alpha,\alpha$-trifluoro-N-methyl-2-($\alpha$-methyliminobenzyl)-p-toluidine as long colorless needles, melting at 100–101°.

Fractions (6) and (7) of the chromatogram, upon crystallization from 5 ml. hexane gave $\alpha,\alpha,\alpha$-trifluoro-N-methyl-2-($\alpha$-methylimino-benzyl)-p-toluidine as colorless prisms melting at 120–122°.

The two samples of $\alpha,\alpha,\alpha$-trifluoro-N-methyl-2-($\alpha$-methylimino-benzyl)-2-toluidine, with differing melting points, obtained above from fractions (1) and (6) and (7) of the chromatogram, represent isomers of the same compound.

EXAMPLE 18

500 mg. of each of the isomers of $\alpha,\alpha,\alpha$-trifluoro-N-methyl-2-($\alpha$-methylimino-benzyl)-p-toluidine in 10 ml. of toluene was treated with 2.5 ml. of water and 2.5 g. of concentrated sulfuric acid. The reaction mixture was extracted with ether and washed with water and 3 N NaOH solution. Evaporation of the solvent followed by crystallization from petroleum ether yielded 2-methylamino-5-trifluoromethylbenzophenone, melting at 74–75° (yellow needles).

EXAMPLE 19

A mixture, consisting of 50.0 g. of 2-chloro-5-trifluoromethyl-benzophenone, 10.0 g. of cuprous chloride and 500 ml. of a saturated solution of methylamine in methanol was heated to 140° for 10 hours in an autoclave. The mixture was concentrated diluted with water and extracted with ether. The ether extract yielded after concentration 45.0 g. of crude reaction product, which partially solidified. Crystallization from 150 ml. of hexane gave a first crop. From the mother liquors, two more crops were obtained.

For the purpose of hydrolysis, these 3 fractions were combined and refluxed for 15 minutes with vigorous stirring in a mixture of 260 ml. of toluene, 120 ml. of water and 120 g. of concentrated sulfuric acid. After cooling, the two layers were separated, the acid layer then being extracted with hexane. The toluene layer and the hexane extract were combined, washed 3 times with 3 N NaOH solution and dried over sodium sulfate. Evaporation of the solution in vacuo, followed by crystallization of the residue from 200 ml. of petroleum ether at 0°, yielded 2-methylamino-5-trifluoromethyl-benzophenone melting at 74–75°.

EXAMPLE 20

A solution of 5.0 g. 2-methylamino-5-trifluoromethyl-benzophenone in 25 ml. of anhydrous ether was treated at 0° with 1.65 ml. of bromoacetyl bromide. A voluminous precipitation occurred. The reaction mixture was allowed to stand two hours at room temperature, whereupon a clear solution resulted. This was added within 15 minutes to 50 ml. of liquid ammonia. The reaction mixture was kept under reflux for one hour, using a Dry Ice-acetone condenser. This was then replaced with a conventional condenser. Stirring overnight at room temperature caused the ammonia to evaporate. After addition of 200 ml. water and 100 ml. ether, the reaction mixture was stirred for a few minutes, filtered, and then washed with water and some ether. After drying in vacuo at 60°, crude 2-amino-2'-benzoyl-4'-trifluoromethyl-N-methylacetanilide was obtained as light yellow needles. Crystallization from 35 ml. of acetone at 0° gave 2-amino-2' - benzoyl - 4' - trifluoromethyl - N - methylacetanilide, melting at 202–203°.

EXAMPLE 21

11.25 g. of o-bromobenzotrifluoride was converted to the Grignard reagent in the usual way using 1.22 g. magnesium and 200 cc. of dry ether. The solution was then added dropwise with cooling and stirring to 9.78 g. of 6-chloro-2-methyl-3,1-benzoxazin-4-one dissolved in 150 cc. of benzene and 50 cc. of ether. The resulting solution was stirred for 1 hour at room temperature, then cooled in an ice bath and the Grignard complex decomposed with 50 cc. of 10 percent hydrochloric acid. The organic layer was separated and dried over anhydrous potassium carbonate for 3 hours. The solvent was then distilled off and the residue treated with a solution of 7 cc. of concentrated hydrochloric acid in 40 cc. of ethanol. After refluxing for 1 hour, the solvents were distilled off and the residue treated with 20 cc. of water. A yellow solid separated. After drying, it was crystallized from hexane, yielding 2-amino-5-chloro-2'-(trifluoromethyl)benzophenone which melted at 97–99°.

EXAMPLE 22

13.3 g. of 2-amino-5-chloro-2'-(trifluoromethyl)benzophenone was dissolved in 250 cc. of dry ether and 8.9 g. of bromoacetyl bromide added dropwise to the solution. After the addition, the solution was stirred for 1 hour and the solvent removed. The residue was crystallized from heptane, yielding 5-chloro-2-bromoacetamide-2'-(trifluoromethyl)benzophenone melting at 139–141°.

EXAMPLE 23

4.2 g. of 5-chloro-2-bromoacetamido-2'-(trifluoromethyl)benzophenone was added to 100 cc. of liquid ammonia containing 50 cc. of ether. The mixture was stirred overnight during which time the ammonia evaporated. Water was added to the residue and the solid filtered. The product, 5-chloro-2-glycylamino-2'-(trifluoromethyl)benzophenone was crystallized from alcohol and melted at 114–116°.

EXAMPLE 24

2.4 g. of 5-chloro-2-glycylamino-2'-(trifluoromethyl)benzophenone was dissolved in 15 cc. of pyridine and the solution was refluxed for 10 hours. The pyridine was distilled off and the residue was repeatedly crystallized from heptane-benzene to give 7-chloro-5-(2-trifluoromethylphenyl) - 3H - 1,4 - benzodiazepin - 2(1H) - one melting at 190–192°.

EXAMPLE 25

A solution of 75 g. of 2-acetamido-6-chlorobenzoic acid in 300 cc. of acetic anhydride was refluxed for 1 hour. The reaction mixture was then concentrated to dryness in vacuo and the residue crystallized from a mixture of benzene and hexane to give 5-chloro-2-methyl-4H-3,1-benzoxazine-4-one, which after recrystallization from benzene-hexane, melted at 143.5–146°.

EXAMPLE 26

A Grignard reagent prepared from 23.6 g. of bromobenzene and 3.9 g. of magnesium in 400 cc. of ether was slowly added to an ice cold suspension of 29.3 g. of 5-chloro-2-methyl-4H-3,1-benzoxazine-4-one in 450 cc. of benzene and 150 cc. of ether. The brown suspension gradually turned to a tan-yellow. The reaction mixture was stirred for 1 hour in an ice bath after the addition of the Grignard reagent was completed and then stirred for 1 hour at room temperature. After chilling to 0° in an ice-salt bath, the magnesium complex was decomposed by the careful addition of 250 cc. of 2 N hydrochloric acid. A white solid crystallized and was filtered off. The organic layer was separated and washed successively with water, dilute sodium hydroxide, and water; then dried over sodium sulfate and the solvent removed by distillation in vacuo. The residual oil of crude 2-acetamino-6-chlorobenzophenone was hydrolyzed by refluxing for 3 hours in 500 cc. of ethanol and 250 cc. of 6 N hydrochloric acid. After concentration to dryness in vacuo, the white crystalline residue was slurried with water, made alkaline with ammonia and extracted with benzene. An orange solid was obtained on evaporation of the benzene. Crystallization from hexane gave 2-amino-6-chlorobenzophenone which melted at 101–102.5°.

EXAMPLE 27

A solution of 10.6 g. of 2-amino-6-chlorobenzophenone in 400 cc. ether was cooled in an ice bath and stirred with 100 cc. of water. While keeping the temperature at 0–5°, 9.25 g. of bromoacetylbromide was slowly added, the mixture being kept slightly alkaline by the simultaneous addition of 1 N sodium hydroxide. Stirring was continued for 15 minutes after the reaction was complete. The reaction mixture was then diluted with 250 cc. of benzene, the organic layer separated, and washed with water. After drying over sodium sulfate the solvent was evaporated in vacuo, leaving a viscous orange residue. Crystallization from a mixture of ethyl acetate and hexane gave 2 - bromoacetoamido-6-chlorobenzophenone, M.P. 97–98°.

EXAMPLE 28

9.0 g. of crystalline 2-bromoacetamido-6-chlorobenzophenone was dissolved in 250 cc. of 16 percent (w./v.) ammonia in methanol and kept at room temperature for 16 hours. The solvent was evaporated in vacuo and the residue partitioned between benzene and water. The organic layer was dried over sodium sulfate and concentrated to dryness in vacuo. The residue was dissolved in 50 cc. of 1:1 benzene-hexane and chromatographed on 50 g. of Woelm alumina, neutral grade III. Elution with 1:1 benzene-hexane and benzene alone gave a product which was crystallized from a mixture of benzene and hexane giving 6 - chloro - 2-glycylaminobenzophenone, M.P. 74–76°. When this material was crystallized from aqueous acetonitrile, it cyclized to give the 6-chloro-5-phenyl - 3H - 1,4-benzodiazepine-2-(1H)-one melting at 248–250°.

EXAMPLE 29

Into a stirred, cooled (10–15°) solution of 92.4 g. (0.4 mole) of 2-amino-5-chlorobenzophenone in 500 cc. of dioxane was introduced simultaneously in small portions 56.5 g. (0.5 mole) of chloroacetyl chloride and 166 cc. of 3 N sodium hydroxide at such a rate as to maintain a neutral reaction. After the addition was completed, the mixture was acidified, concentrated in vacuo to a small volume and diluted with water. The reaction product, 2-chloroacetamido - 5-chloro-benzophenone, was extracted with benzene and crystallized from a mixture of benzene, ether, and petroleum ether. It forms long prisms melting at 117–118°.

EXAMPLE 30

A solution of 6.6 g. of 2-chloroacetamido-5-chlorobenzophenone in 50 cc. of benzene was combined with 20 cc. of a 10 percent solution of methylamine in methanol. The mixture was left at room temperature for 48 hours and concentrated in vacuo to a small volume. The residue was cooled with ice, dissolved in dilute hydrochloric acid, and impurities were extracted with benzene. The aqueous solution was made alkaline and the reaction product was extracted with benzene. The extract was concentrated in vacuo and the oily residue converted into the hydrochloride by the addition of the calculated amount of 1 N methanolic hydrochloric acid. The product, 2-(methylaminoacetamido) - 5-chlorobenzophenone hydrochloride, was recrystallized from a mixture of methanol and acetone. It forms rhombic plates melting at 200–201°.

EXAMPLE 31 o-Chlorobenzoyl chloride (600 g.) was heated to 110° in a 5 l. three-necked flask equipped with thermometer, mechanical stirrer, and reflux condenser. To this p-chloroaniline (175 g.) was added under stirring. The mixture was then heated to 180° and zinc chloride (230 g.) was added. The temperature was gradually raised to 220–230° and kept there until the $HC_1$ evolution had ceased (1–2 hours). After cooling to 120°, water was continuously added and the mixture heated to reflux. The hot water layer was decanted and this procedure repeated 2 or 3 times.

The water insoluble brown mass was finally dissolved in a mixture of 350 ml. water, 500 ml. acetic acid and 650 ml. concentrated sulfuric acid and heated to reflux for 17 hours. After cooling, the homogeneous dark solution was poured into ice water and the mixture extracted with ether. The ether extract was washed neutral with 2 N NaOH. Concentration of the ether solution and the addition of a small amount of petroleum ether yielded 2-amino-2′,5-dichlorobenzophenone in yellow crystals. Recrystallization from a mixture of ether and petroleum ether yielded the pure compound, melting at 88–89°.

EXAMPLE 32

2-amino-2′,5-dichlorobenzophenone (100 g.) was treated with bromoacetyl bromide (100 g.) in 500 ml. of benzene. After a few hours the reaction mixture was washed with $NaHCO_3$ solution and water. Crystals which had separated from the benzene solution were filtered off and an additional crop was collected after concentrating the mother liquor. Recrystallization from benzene yielded pure 2-bromoacetamido-2′,5-dichlorobenzophenone melting at 136°.

EXAMPLE 33

2-bromoacetamido-2′,5-dichlorobenzophenone (4.2 g.) was dissolved in tetrahydrofuran (75 ml.) in a three-necked flask equipped with stirrer, gas inlet tube and Dry Ice condenser. About 100 ml. of liquid ammonia was added and the mixture was refluxed for several hours. The solution was stirred overnight and the excess of ammonia allowed to evaporate. The mixture was then concentrated in vacuo and the residue treated with water, causing the precipitation of crystals of 2-aminoacetamido-2′,5-dichlorobenzophenone, which after recrystallization from methanol melted at 122–124°.

EXAMPLE 34

2 - aminoacetamido - 2′,5-dichlorobenzophenone (1.2 g.) was refluxed in pyridine (50 ml.) for 17 hours. After evaporation of the pyridine in vacuo, the residue was treated with ether and water. The ether layer was separated, washed with water and concentrated, yielding crystals of 7 - chloro-5-(2-chlorophenyl)-3H-1,4-benzodiazepin-2(1H)-one melting at 199–201°.

EXAMPLE 35

2 - aminoacetamido - 2′,5 - dichlorobenzophenone was heated (170°) above the melting point for 1 hour. The formed brown melt was triturated with methanol and a high melting insoluble contaminant was filtered off. The mother liquor yielded on concentration 7-chloro-5-(2-chlorophenyl)-3H-1,4-benzodiazepin-2(1H)-one.

EXAMPLE 36

To a solution of 26.5 g. of 2-amino-2′,5-dichlorobenzophenone in 200 ml. of pyridine 25 g. of tosyl chloride was added. The mixture was refluxed for 1 hour and left at room temperature overnight. After pouring the solution into water, crystals of 2′,5-dichloro-2-(p-toluenesulfonamido)-benzophenone were collected which, after recrystallization from ethanol, melted at 136–138°.

EXAMPLE 37

2′,5 - dichloro - 2 - (p-toluenesulfamido)-benzophenone (31 g.) was dissolved with 1 N methanolic sodium methylate solution (80 ml.) and enough methanol to produce a clear solution. The methanol was then removed in vacuo and the residue dissolved in 200 ml. of dimethyl formamide. On addition of 25 ml. of methyliodide the temperature of the solution increased to 30°. After 1 hour standing at room temperature the main amount of solvent was distilled off in vacuo and the residue poured into water. Crystals of 2′,5 - dichloro - 2 - (N-methyl-p-toluenesulfonamido)-benzophenone were collected and melted at 153–5°. Recrystallization from different solvents gave a solid which melted at 145°, resolidified, and melted again at 153–155°.

EXAMPLE 38

2′,5 - dichloro - 2 - (N-methyl-p-toluenesulfonamido)-benzophenone was heated with a hydrolizing solution made by mixing concentrated sulfuric acid (325 ml.), acetic acid (250 ml.) and ice (75 g.). After refluxing for 20 hours the mixture was poured on ice, and extracted with ether. The acids were removed by extracting the ether layer with 2 N NaOH. Concentration of the ether extract and addition of hexane yielded yellow crystals of 2′,5-dichloro-2-methylaminobenzophenone melting at 78–80°. After resolidification the compound melted again at 88–90°.

EXAMPLE 39

2′,5 - dichloro - 2 - methylaminobenzophenone (8.5 g.) was refluxed for 1 hour in 100 ml. of benzene with 3.5 ml. of bromoacetyl bromide. The brown solution was washed with NaHCO solution and water, dried and evaporated in vacuo. The residue was dissolved in 250 ml. of tetrahydrofuran, then ca.100 ml. of liquid ammonia was added and allowed to evaporate slowly. After 24 hours the mixture was concentrated in vacuo, the residue treated with water and ether, and the ether solution dried and partly concentrated. The precipitated crystals were filtered off and recrystallized from ether, giving 2-amino-4′-chloro-2′-(2-chlorobenzoyl)-N-methylacetanilide as slightly yellowish needles melting at 157–159°

EXAMPLE 40

Into a cooled solution of 10 g. of 2-(2-bromoacetamido)-2′-5-dichlorobenzophenone in tetrahydrofuran, methylamine was passed until saturation. The solution was stirred overnight at room temperature, then the solvent was evaporated and the residue taken up in ether. The ether solution was washed with water and concentrated to a small volume. On addition of petroleum ether, crystals of 2′,5-dichloro-2-methylaminoacetamido-benzophenone separated melting at 106–108°.

EXAMPLE 41

A solution of 10 g. of 2-bromoacetamido-2′,5-dichlorobenzophenone in tetrahydrofuran 150 ml., was saturated with dimethylamine. The solution was then stirred overnight at room temperature and worked up by evaporating the solvent and extracting the residue with ether. The extract was then washed with water and concentrated to a small volume. Addition of petroleum ether yielded crystals of 2′,5 - dichloro - 2 - dimethylaminoacetamido-benzophenone melting at 112–114°.

EXAMPLE 42

3.4 g. of 4 - chloro-2-(2 - chlorobenzoyl)phenylcarbamoylmethyl dimethylamine (i.e. 2′,5-dichloro - 2 - (dimethylaminoacetamido)-benzophenone) was dissolved in 50 ml. acetone containing 30 percent methylene bromide. The solution was kept in a sealed bottle at room temperature for 48 hours. After removing the solvent in vacuo the residue was dissolved in a small amount of acetone. White crystals of 4-chloro-2-(2-chlorobenzoyl)phenylcarbamoylmethyltrimethylammonium bromide were obtained which melted with decomposition at 205–215°.

EXAMPLE 43

To 100 g. of o-toluyl chloride heated to 100° in a three-neck flask equipped with thermometer, condenser, and mechanical stirrer, 38 g. of p-chloroaniline was added. The mixture was heated to 180° and 54 g. of zinc chloride was introduced. The heating was continued and within 1 hour a temperature of 230° was reached. The mixture was kept at this temperature for one additional hour. After cooling to 120°, water was cautiously added and the mixture heated to reflux. The hot water layer was decanted and the procedure repeated 5 times. The water insoluble material was refluxed for 17 hours with a mixture of 350 ml. of 48% hydrobromic acid and 350 ml. of acetic acid. The dark solution was cooled and poured into water. Extraction with ether, washing the ether extract with 2 N NaOH, and evaporation of the solvent yielded a dark brown solution which was distilled in vacuo (0.2 mm.). At 150–160° a yellow viscous oil was collected. A sample was purified by gas chromatography and on scratching gave yellow crystals of 2-amino-5-chloro-2′-methylbenzophenone, melting at 50–55° after recrystallization from heptane.

EXAMPLE 44

2-amino-5-chloro-2′-methylbenzophenone (21 g.) was dissolved in a mixture of 400 ml. of ether and 6 ml. of pyridine and to this solution bromoacetylbromide (21 g.) dissolved in ether (50 ml.) was slowly added. After 2 hours the ether was washed several times with water and concentrated. White crystals of 2-(2-bromoacetamido)-5-chloro-2′-methylbenzophenone, which melted at 137–138° were collected.

EXAMPLE 45

2 - ( 2 - bromoacetamido) - 5 - chloro - 2′ - methylbenzophenone (5.5 g.) was dissolved in tetrahydrofuran (100 ml.). Liquid $NH_3$ was added and the mixture was refluxed for several hours. The solution was stirred overnight and the excess of ammonia allowed to evaporate. Tetrahydrofuran and the last amounts of ammonia were removed in vacuo, the residue treated with water and the crystals which precipitated were filtered off. Recrystallization from methanol and ether-petroleum ether gave crystals of 2 - (aminoacetamido) - 5 - chloro - 2′ - methylbenzophenone melting at 121–123°.

EXAMPLE 46

A mixture of 176 g. of o-fluoro benzoyl chloride and 64 g. of p-chloroaniline was stirred and heated to 180°, at which temperature 87 g. of zinc chloride was introduced. The temperature was raised to 200–205°, and maintained there for forty minutes. The golden colored melt was quenched by the careful addition of 500 ml. of 3 N hydrochloric acid and the resulting mixture refluxed for five minutes. The acid solution was decanted and the process repeated three times to remove all o-fluorobenzoic acid. The grey granular residue was dissolved in 300 ml. of 75% (vol./vol.) sulfuric acid and refluxed for forty minutes to complete hydrolysis. The hot solution was poured over 1 kg. of ice and diluted to two liters with water. The organic material was extracted with four 300 ml. portions of methylene chloride which were subsequently washed with two 500 ml. portions of 3 N hydrochloric acid to remove traces of p-chloroaniline, three 500 ml. portions of 5 N sodium hydroxide solution to remove o-fluorobenzoic acid, and finally two 200 ml. portions of saturated brine solution. The methylene chloride extract was dried over anhydrous sodium sulfate and the solvent removed to give the crude aminobenzophenone. Recrystallization from methanol gave 2-amino - 5 - chloro-2′-fluorobenzophenone as yellow needles, melting at 94–95°.

EXAMPLE 47

A solution of 36 ml. of bromoacetyl bromide in 75 ml. of ether was added to an ethereal solution of 68 g. of 2 - amino - 5 - chloro - 2′ - fluorobenzophenone and shaken. The resultant mixture was concentrated to a small volume and the resulting white crystalline product filtered off, washed with water, and recrystallized from methanol to give 2 - (bromoacetamido) - 5 - chloro-2′-fluorobenzophenone as fine white needles, melting at 132.5–133°.

EXAMPLE 48

2 - (bromoacetamido) - 5 - chloro-2′-fluorobenzophenone (35 g.) was suspended in 800 ml. of liquid ammonia and the ammonia allowed to evaporate over fifteen hours. The resultant mixture was ground thoroughly with water in a mortar with a pestle so as to remove ammonium bromide, and then the product was crystallized from benzene-hexane to give white needles of 2-(aminoacetamido)-5-chloro-2′-fluorobenzophenone, melting at 115–115.5°.

EXAMPLE 49

7 - chloro - 5 - (2 - fluorophenyl) - 3H - 1,4 - benzodiazepin-2(1H)-one was obtained from 2 - aminoacetamido - 5 - chloro - 2′ - fluorobenzophenone by simply refluxing the compound for seventeen hours in any one of the following solvents: (a) pyridine, (b) toluene, (c) p-cymene. The product was obtained by removal of the solvent in vacuo and crystallization of the residue from acetone-hexane, M.P. 205–206°.

EXAMPLE 50

2- aminoacetamido - 5 - chloro - 2′ - fluorobenzophenone was suspended in a methanolic ammonia solution and stirred overnight. The solvent was then removed in vacuo and the residue dissolved in methylene chloride. The methylene solution was thoroughly extracted with water, dried over anhydrous sodium sulfate and concentrated to an oil which crystallized on the addition of a small amount of acetone. The product was recrystallized from acetone-hexane giving 7 - chloro - 5 - (2 - fluorophenyl) 3H - 1,4 - benzodiazepin-2(1H)-one, M.P. and mixed M.P. 205–206°.

EXAMPLE 51

The procedure used in this preparation is essentially that used in Example 46. Reaction times and temperatures were varied as were hydrolysis conditions.

To a mixture of 580 g. of o-fluorobenzoyl chloride and 265 g. of p-bromoaniline at 180°, 262 g. of zinc chloride was added with stirring. The temperature was raised to 195–205° and maintained there for two hours. The reaction mixture was quenched and washed with acid, as in the previous example, and the residue was hydrolyzed for twenty hours with 1 liter of 60% (v./v.) sulphuric acid. The product, 2 - amino - 5 - bromo - 2′ - fluorobenzophenone, was extracted as before. It forms yellow needles melting at 101–102°.

EXAMPLE 52

An ethereal solution was prepared from 70 g. of 2-amino - 5 - bromo - 2' -fluorobenzophenone and to this was added a solution containing 21.5 ml. of bromoacetyl bromide in 50 ml. ether. The mixture was washed with water, the aqueous layer was discarded, and the ether solution concentrated. The precipitate formed during the concentration was filtered off and the filtrate was treated twice more as before with portions of a bromoacetyl bromide-ether solution. The combined precipitates were washed well with water and recrystallized from methanol to give 2 - bromoacetamido - 5 - bromo - 2' - fluorobenzophenone as white needles melting at 139–140°.

EXAMPLE 53

2 - (bromoacetamido) - 5 - bromo - 2' - fluorobenzophenone (60 g.) was suspended in 1 liter of liquid ammonia and treated, as was the bromoacetamido compound in Example 48, to give 2 - aminoacetamido-5-bromo-2'-fluorobenzophenone as white needles melting at 110–111°.

EXAMPLE 54

50 g. of 2 - aminoacetamido - 5 - bromo - 2' - fluorobenzophenone was fused in an oil bath at a temperature of 180°. The melt was maintained at this temperature until all evolution of water had ceased. Recrystallization of the reaction mixture from acetone afforded 7 - bromo-5 - (2 - fluorophenyl) - 3H - 1,4 - benzodiazepin-2(1H)-one as white prisms, M.P. and mixed M.P. 186–187°.

EXAMPLE 55

A mixture consisting of 170 g. of 2-amino-5-methylbenzophenone, 300 ml. acetic anhydride and 600 ml. benzene was stirred and refluxed for 2 hours. The reaction mixture was cooled in an ice bath and the precipitate which was formed was collected on a suction funnel and washed with ether, yielding 2-acetamido-5-methyl-benzophenone melting at 154–155°.

EXAMPLE 56

To a stirred refluxing mixture of 50 g. of 2-acetamido-5-methyl-benzophenone and 2.5 liters of water 71 g. of potassium permanganate was added in small portions over a period of 30 minutes. The resulting mixture, containing starting material, the oxidation product and manganese dioxide was allowed to reflux for an additional 2 hours; then it was filtered hot through a filter aid. The clear filtrate was acidified with 3 N hydrochloric acid (approximately 100 ml.) and cooled in the refrigerator overnight. The precipitated product, 2-acteamido-5-carboxy-benzophenone, was filtered, washed with water and dried for 12 hours in vacuo at 50°. Crystallization from ethanol yielded the pure product as slightly yellow needles melting at 211°.

EXAMPLE 57

42.5 g. of 2-acetamido-5-carboxy-benzophenone was dissolved in 700 cc. of chloroform containing 15 g. of triethylamine. 16 g. of ethyl chlorocarbonate was added dropwise in the cold. The mixture was stirred for 3 hours, then gaseous ammonia was introduced with cooling. The reaction mixture was kept at room temperature over the weekend and then filtered. The precipitate was inorganic material which was discarded. The filtrate was acidified and the chloroform layer evaporated to dryness. The residue obtained was washed with water, and the water insoluble product so-obtained was crystallized from acetic acid to yield 2-acetamido-5-carbamoylbenzophenone melting at 207–208.5°.

EXAMPLE 58

34 g. of 2-acetamido-5-carbamoyl-benzophenone was dissolved in 250 cc. of ethylene dichloride and treated with 30 cc. of phosphorous oxychloride. The latter reagent was introduced dropwise at 65°. The amide was completely dissolved within a short time. Heating at 65° was continued for 2 hours after which the reaction mixture was cooled and poured into 600 cc. of ice water. The organic layer was separated and washed with water until neutral, then dried over magnesium sulfate and concentrated in vacuo, yielding crude 2-acetamido-5-cyanobenzophenone. About 8.7 g. of the crude 2-acetamido-5-cyanobenzophenone so-obtained was taken up in 100 cc. of methanol and treated, while the solution was still warm, with 50 cc. of 30% aqueous sodium hydroxide solution. The crystalline product separated almost immediately. After standing for 2 to 3 hours at room temperature the reaction mixture was filtered. The precipitated 2-amino-5-cyanobenzophenone was washed with water and then dried. After two recrystallizations from alcohol, pure product melting at 165.5–166.1° was obtained.

EXAMPLE 59

5 g. of 2-amino-5-cyanobenzophenone was dissolved in a mixture of 100 cc. of benzene and 100 cc. of ether. 2.7 g. of pyridine and 6.8 g. of bromoacetyl bromide were added to the cooled solution, and the resulting mixture allowed to stand at room temperature overnight. An excess of ethereal hydrogen chloride was then added. The precipitate was filtered off and washed with water to remove pyridine salts and to liberate the reaction product precipitated in the form of its hydrochloride. Recrystallization from methylene chloride and alcohol afforded 2-bromoacetamido-5-cyanobenzophenone melting at 144–145°.

EXAMPLE 60

A solution of 1.95 g. of 2-bromoacetamido-5-cyanobenzophenone in approximately 200 cc. of liquid ammonia was stirred for 1 hour and then evaporated in about 10 minutes. The residue was partitioned between 100 cc. of ether and 100 cc. of water containing 36 cc. of 0.3 N hydrochloric acid. The aqueous layer was extracted with ether and then treated with an excess of ammonium hydroxide. The precipitated product rapidly solidified, was filtered off, washed with water and dried to give 2-aminoacetamido-5-cyanobenzophenone as a colorless material. Crystallization from a mixture of benzene and ether gave colorless needles of the product melting at 151–153°.

EXAMPLE 61

A solution of 16.5 g. of acet-m-anisidine and 17.5 g. of benzoyl chloride in 95 cc. of carbon disulfide was cooled to 7° in an ice bath and 19 g. of anhydrous aluminum chloride added slowly in portions. When about half of the aluminum chloride had been added, a viscous green aluminum chloride complex began to separate. The reaction was warmed to 35° and the remainder of the aluminum chloride was added. At this point the dark green precipitate prevented stirring. (In a subsequent preparation, the aluminum chloride was added at 20-25°. About 10 minutes after the completion of the addition of aluminum chloride, the evolution of hydrogen chloride was noted. The reaction mixture was stirred 1 hour at room temperature and 1 hour at reflux.) The carbon disulfide was decanted from the viscous material and discarded. The residue was then decomposed with ice and dilute hydrochloric acid. The oily layer that separated was extracted with benzene, and the benzene layer washed with dilute hydrochloric acid, water, and then twice with dilute sodium hydroxide and water. Following drying over sodium sulfate, the solvent was evaporated in vacuo leaving a viscous residue. Recrystallization from benzene-hexane gave 4-acetamido-2-methoxy-benzophenone, which upon further crystallization from a mixture of benzene and hexane melted at 142–143°.

The benzene-hexane mother liquors from the above crystallizations were concentrated to dryness and the residue crystallized from aqueous ethanol to give 2-acetamido-4-methoxybenzophenone, which upon further crystallization from dilute ethanol melted at 118–119.5.°

EXAMPLE 62

A solution of 5.2 g. of 2-acetamido-4-methoxybenzophenone in 100 cc. of acetic acid was warmed to 50–55° and 3.1 g. of bromine in 25 cc. of acetic acid was slowly added. The bromine decolorized rapidly. After all the bromine had been added, the reaction was kept at 50–55° for 1 hour. Solvent was then removed by distillation in vacuo and the crystalline residue recrystallized from dilute ethanol. 2 - acetamido-5-bromo-4-methoxybenzophenone melting at 144–146° was obtained. Recrystallization did not change the melting point.

EXAMPLE 63

5.5 g. of 2-acetamido-5-bromo-4-methoxybenzophenone was hydrolyzed by refluxing for 3 hours in 250 cc. of ethanol and 250 cc. of 6 N hydrochloric acid. The reaction mixture was concentrated to dryness in vacuo, the residue slurried with water, made alkaline with ammonia and then extracted with benzene. After drying over sodium sulfate, the solvent was removed by distillation in vacuo. Crystallization from benzene-hexane gave 2-amino-5-bromo-4-methoxybenzophenone melting at 150–151.5°. Recrystallization did not alter the melting point.

EXAMPLE 64

To a solution of 3.8 g. of 2-amino-5-bromo-4-methoxybenzophenone in 150 cc. of ether, 40 cc. of 1 N NaOH and 3.5 g. of bromoacetyl bromide were added while stirring. The yellow color of the ether layer disappeared almost immediately on mixing. After ¾ of an hour the organic layer was separated, washed with water and dried over sodium sulfate. The residue obtained after evaporation of solvent was crystallized from benzene-hexane giving 2-bromoacetamido-5-bromo-4-methoxybenzophenone, which upon recrystallization melted at 145°.

EXAMPLE 65

A suspension of 3.7 g. of 5-bromo-2-bromoacetamido-4-methoxybenzophenone in 200 cc. of 20 percent (w./v.) ammonia in methanol was stirred for 24 hours at room temperature. The insoluble material was filtered off. Several recrystallizations from benzene or methylene chloride-hexane gave 250 mg. of 5-bromo-2-glycylamino-4-methoxybenzophenone which melted at 161–163°, resolidified at 165–168° and then remelted at 248–251°.

EXAMPLE 66

75 mg. of 5-bromo-2-glycylamino-4-methoxybenzophenone was heated in an oil bath at 200° for several minutes. The material first melted and then resolidified. Crystallization from a mixture of benzene and hexane gave 7 - bromo - 8-methoxy-5-phenyl-3H-1,4-benzodiazepin-2-(1H)-one, which melted at 249.5–251.5°.

EXAMPLE 67

A solution of 46.3 g. of 2-amino-5-chlorobenzophenone in 200 cc. of ether was cooled below 20°, by the addition of ice, and 50.5 g. of bromoacetyl bromide was added in small portions during 20 minutes. The reaction mixture was stirred and the temperature was kept below 20° by further additions of ice. At the end of the addition, the ether layer was thoroughly washed with water and the crystallized material was filtered off and washed with water and then ether to give the product as pale yellow prisms. The ether mother liquor was concentrated and the residue was crystallized from a mixture of chloroform and hexane to give a further crop of the product. The product, 2-bromoacetamido-5-chlorobenzophenone, crystallized from a mixture of chloroform and hexane as pale yellow prisms melting at 124–125°.

EXAMPLE 68

A solution of 15 g. of 2-bromoacetamido-5-chlorobenzophenone in 500 cc. of liquid ammonia was allowed to evaporate overnight. The residue was stirred with 250 cc. of water for 30 minutes and the pale yellow needles remaining after the removal of the inorganic salts were filtered off, washed with ether and dried. Crystallization from a mixture of benzene-hexane gave 2-aminoacetamido-5-chlorobenzophenone which melted at 97–99°.

EXAMPLE 69

A suspension of 1 g. of 2-aminoacetamido-5-chlorobenzophenone in 2 cc. of methanol was treated with 0.56 cc. (1.2 equivalents) of a 7.55 N solution of hydrogen chloride in methanol. The resulting solution was diluted with 5 cc. of anhydrous ether, which caused the crystallization of 2-aminoacetamido-5-chlorobenzophenone hydrochloride. It forms pale yellow prisms melting at 192–193° (dec.).

EXAMPLE 70

137 g. of anthranilic acid was dissolved in 250 cc. of dimethylformamide. The solution was cooled to 0° and 85 cc. (155 g.) of thionyl chloride was added dropwise, while the temperature of the reaction mixture was maintained below 40°. After allowing the mixture to cool to room temperature, 750 cc. of acetone were added. It was then cooled to 0°. The white 2-dimethylformamidinoanthranilic acid hydrochloride which separated was filtered off on a fritted glass funnel, washed with 300 cc. cold acetone, sucked dry and found to have a melting point 215–217°.

115 g. of 2-dimethylformamidinoanthranilic acid hydrochloride was suspended in 1500 cc. of thiophene-free benzene. 119 g. of phosphorus pentachloride was added and the mixture was refluxed on the steam bath for about 2½ hours until completion of the reaction was indicated by a change in color to yellowish brown. The reaction mixture was then cooled to 20–25° and 290 g. of anhydrous aluminum chloride was added in four portions, keeping the temperature below 40°. The mixture was refluxed on the steam bath for 6 hours. After cooling to room temperature, 800 g. of crushed ice was added in 100 g. portions, keeping the temperature below 50°. The mixture was then heated to 60° and again cooled to room temperature. Next ca. 1100 cc. of 40 percent sodium hydroxide was added dropwise to pH 11, keeping the temperature below 50°. After the addition of all the alkali, the mixture was refluxed on the steam bath for 5 hours. The benzene phase was separated and the aqueous phase was extracted with three 250 cc. portions of benzene. The combined benzene solutions were concentrated in vacuo and the oily residue was refluxed for 20 hours with a mixture of 150 cc. of 40 percent sodium hydroxide, 150 cc. of water and 300 cc. of alcohol. The alcohol was distilled off at atmospheric pressure and the aqueous residue was cooled to room temperature. 1000 cc. of water was then added dropwise, precipitating 2-aminobenzophenone. The yellow product was filtered off, washed with cold water and sucked dry, M.P. 103–105°.

30 g. of 2-aminobenzophenone and 40 g. of sodium thiocyanate were suspended in 100 cc. of methanol. After cooling to 0°, a cold solution of 9.5 cc. of bromine (28.5 g.) dissolved in 35 cc. of cold methanol (saturated with sodium bromide) was added dropwise. After completing the addition, the reaction mixture was stirred in the cold for an additional ½ hour and poured into 1 liter of cold water. After neutralization with 110 cc. of 20 percent Na$_2$CO$_3$, the product, 2-amino-5-thiocyanobenzophenone, was filtered off and crystallized from dilute ethanol as yellow plates melting at 83–84°.

39 g. of 2-amino-5-thiocyanobenzophenone was suspended in 200 cc. of ethanol. The mixture was heated to 50° on the steam bath and a total of 55 g. of sodium hydrosulfite and 250 cc. of 10 percent sodium hydroxide was added alternately in portions. The temperature was raised to 80°. At this point the reaction mixture gave a blue coloration with indanthrene yellow paper, indicating the presence of an excess of $Na_2S_2O_4$.

After cooling to 40°, 20 cc. (27 g.) of dimethyl sulfate was added dropwise. A negative reaction with lead acetate at this point indicated the absence of free mercaptan. The mixture was stirred for 1 hour at room temperature and then the ethanol was distilled off. The aqueous phase was diluted with 700 cc. of water and the oily thioether was extracted with four 300 cc. portions of benzene. The benzene phase was dried and the solvent removed by vacuum distillation. The crude reaction product, 2-amino-5-methylthiobenzophenone, remained as a heavy oil.

EXAMPLE 71

A solution of 24.5 g. of crude 2-amino-5-methylmercaptobenzophenone in a mixture of 250 cc. of ether and 250 cc. of benzene was stirred while 13.4 cc. of bromoacetyl bromide was added during 20 minutes. The temperature was kept below 15° by the addition of ice to the reaction mixture. Some insoluble material was filtered off and the organic layer was washed first with water, then with 5% sodium bicarbonate solution until neutral, and finally with water. After drying over anhydrous sodium sulfate the organic layer was concentrated in vacuo to an oil which was crystallized from ether and recrystallized from methanol yielding yellow prisms of 2-bromoacetamido - 5 - methylmercaptobenzophenone melting at 114–115°.

EXAMPLE 72

A solution of 3.64 g. of 2-bromoacetamido-5-methylthiobenzophenone in approximately 300 cc. of liquid ammonia was stirred for 1 hour and then quickly evaporated to dryness during 15 minutes. The residue was extracted with anhydrous ether and, after filtering off the inorganic salts, the solution was treated with 7.25 N methanolic hydrogen chloride, until no further precipitate was produced. The hydrochloride formed was filtered off and dissolved in 100 cc. of water and the base was precipitated with 25 cc. of a 5 percent aqueous solution of sodium bicarbonate. The oily base was dissolved in ether and after drying over sodium sulfate the ether solution was diluted with 10 percent by volume of methanol and then treated with 1.51 cc. (1.1 equivalents) of a 7.25 N solution of hydrogen chloride in methanol to give 2-amino-acetamido-5-(methylthio)benzophenone hydrochloride as yellow needles melting at 169–171°. Crystallization from methanol and ether gave no change in melting point.

EXAMPLE 73

A solution of 2.25 g. of 2-amino-5-nitrobenzophenone in 150 cc. of benzene was treated with 2 cc. of α-bromopropionyl bromide. Dry air was blown through the solution for one hour until the hydrogen bromide had been removed. The solution was then concentrated in vacuo and the residue was crystallized from ether. The 2-(α-bromopropionamido) - 5 - nitrobenzophenone was recrystallized from a mixture of chloroform and hexane to obtain light straw-colored needles melting at 116–117°.

EXAMPLE 74

A solution of 4.5 g. of 2-(2'-bromo-propionamido)-5-nitrobenzophenone in 100 cc. of nitromethane was saturated with ammonia and allowed to stand at room temperature for 70 hours. The solution was concentrated in vacuo at a water bath temperature of ca. 20°. The residue was dissolved in a methylene chloride-ether mixture and the inorganic salts were filtered off. The filtrate was concentrated in vacuo and the residue was crystallized from a mixture of benzene and hexane, to give crude 2 - (2 - aminopropionamido) - 5-nitrobenzophenone. This was dissolved in 0.3 N hydrochloric acid and the solution was filtered and neutralized with ammonium hydroxide. The base was then filtered off and after drying was recrystallized from ethanol to give colorless needles melting at 155–156°.

EXAMPLE 75

A solution of 2.42 g. of 2-amino-6-nitrobenzophenone in 200 cc. of benzene was treated with 1.33 cc. of bromoacetyl bromide. After standing for 5 minutes, the solution was washed with water and treated with 0.5 cc. of bromoacetyl bromide and again washed with water. After a further treatment with 0.5 cc. of bromoacetyl bromide the organic layer was thoroughly washed with water and, after drying, concentrated in vacuo. The residue was crystallized from ether, then recrystallized from chloroform-hexane to yield 2-bromoacetamido - 6 - nitrobenzophenone as straw-colored prisms melting at 102–103°.

EXAMPLE 76

A solution of 1.39 g. of 2-bromoacetamido-6-nitrobenzophenone in a mixture of 60 cc. of methanol and 20 cc. of a 13 percent solution of ammonia in methanol (wt./vol.) was allowed to stand at room temperature for 16 hours. The resulting brown-colored solution was concentrated in vacuo at room temperature and the residue was partitioned between 50 cc. of ether and 100 cc. of 0.1 N hydrochloric acid. The hydrochloric acid layer was again extracted with ether and then treated with charcoal at room temperature. The filtered acid extract was neutralized with ammonium hydroxide solution and the precipitated crystalline base was filtered off and dried in vacuo to give 2-aminoacetamido - 6 - nitrobenzophenone. Extraction of the neutralized aqueous solution with chloroform and crystallization of the extract from ether gave an additional amount of the product. Crystallization from ether gave almost colorless prisms melting at 133–134°.

EXAMPLE 77

To a solution of 7.26 g. of 2-amino-5-nitrobenzophenone in 350 cc. of benzene was added 2.8 cc. of bromoacetyl bromide. Dry air was blown through the solution until all the hydrogen bromide was removed. The benzene solution was washed with water until the washings were neutral, then dried over sodium sulfate and concentrated in vacuo. The residue was crystallized from a mixture of benzene and petroleum ether to give 2-bromoacetamido-5-nitrobenzophenone in the form of colorless needles melting at 155–156°.

EXAMPLE 78

A solution of 5 g. of 2-bromoacetamido-5-nitrobenzophenone in 75 cc. of dioxane was treated with 25 cc. of a 10% solution of ammonia in methanol (wt./vol.) The solution was allowed to stand at room temperature for 4 hours and then partitioned between 250 cc. of ether and 150 cc. of 0.1 N hydrochloric acid. The ether solution was again extracted with 90 cc. of 0.1 N hydrochloric acid. The combined acid extracts containing the reaction product were then extracted twice with 100 cc. of ether and then treated with an excess of ammonium hydroxide solution. The precipitated 2-aminoacetamido-5-nitrobenzophenone was filtered off and dried in vacuo. On recrystallization from chloroform and ether it forms light straw colored needles melting at 166–167° (dec.).

EXAMPLE 79

A suspension of 91 g. of 2-aminoacetamido-5-nitrobenzophenone in 900 cc. of methanol was treated with 44 cc. (1.1 equivalents) of a 7.55 N solution of hydrogen chloride in methanol. The mixture was warmed slightly to complete solution and then diluted with 2 liters of anhydrous ether to give 2-aminoacetamido-5-nitrobenzophenone hydrochloride as colorless needles, melting at 212–214° (dec.). Crystallization from methanol and ether gave no change in the melting point.

EXAMPLE 80

2 - aminoacetamido - 5 - nitrobenzophenone was heated for 5 minutes at 165–187°. The compound melted, frothed, and resolidified. The mass was dissolved in chloroform and decolorized with charcoal. The chloroform solution was concentrated in vacuo and treated with ether to yield crystalline 7-nitro-5-phenyl-3H-1,4-benzodiazepin-2(1H)-one.

EXAMPLE 81

A solution of 2.2 g. of 2-amino-4-nitrobenzophenone in 150 cc. of benzene and 30 cc. of ether was treated with 0.75 cc. of bromoacetyl bromide. After standing for 5 minutes, the solution was washed with 150 cc. of water and the procedure was repeated with further quantities of bromoacetyl bromide and water until the yellow color of the solution had disappeared. The organic layer was washed with water until the washings were neutral and was then dried over sodium sulfate and concentrated in vacuo. The residue was crystallized first from hexane-ether and then hexane-chloroform to give 2-bromoacetamido-4-nitrobenzophenone in the form of straw-colored plates melting at 120–121°.

EXAMPLE 82

A solution of 2.03 g. of 2-bromoacetamido-4-nitrobenzophenone in a mixture of 100 cc. of ether and 50 cc. of a 10 percent solution of ammonia in methanol (wt./vol.) was allowed to stand at room temperature for 18 hours. The solution was then concentrated to dryness in vacuo at a water bath temperature of 30°. The residue was partitioned between ether and water and some insoluble material was filtered off. The aqueous layer was made alkaline with ammonium hydroxide and yielded, as a yellow material, 2-aminoacetamido-4-nitrobenzophenone melting at 118–120°.

EXAMPLE 83

A stirred solution of 18 g. of 2-amino-5-methylbenzophenone in 100 cc. of ether was treated with 4.5 cc. of bromoacetyl bromide. After 2–3 minutes, ice and water were added and additional amounts of bromoacetyl bromide introduced. The temperature of the reactants was kept below 20° by the addition of ice while a total of 11.4 cc. of bromoacetyl bromide was added. At the end of the addition the ether was washed with water, and the crystallized material was filtered off to give 2-bromoacetamido - 5 - methylbenzophenone. Treatment of the mother liquors with bromoacetyl bromide gave a further crop. Recrystallization from a mixture of benzene and ether yielded colorless prisms melting at 116–117°.

EXAMPLE 84

A solution of 3.32 g. of 2-bromoacetamido-5-methylbenzophenone in approximately 200 cc. of liquid ammonia was stirred for 1 hour. The ammonia was then evaporated in ca. 10 minutes using a water bath at room temperature. The residue was partitioned between 100 cc. of water and 150 cc. of ether with the addition of a sufficient amount of 0.3 N hydrochloric acid to keep the aqueous layer acid (pH ca. 2–3). The aqueous layer was separated, extracted with ether again, and then treated with an excess of ammonium hydroxide solution. The liberated oil was extracted with ether and the ether was washed twice with water to remove any dissolved ammonia. The ether solution was then dried over sodium sulfate and divided into two portions in the ratio of 1:4. The larger portion was treated with hydrogen chloride gas until a faint yellow tinge appeared. The ether solution that had been retained was then added to the main solution to give a completely white emulsion which crystallized on scratching. The product was washed with ether to give colorless micro-prisms of 2-aminoacetamido-5-methylbenzophenone hydrochloride. The melting point was not sharp; the sample decomposing from ca. 80° upwards.

EXAMPLE 85

160 g. of o-fluorobenzoic acid chloride was heated with stirring to 110°. To this was added, over a period of about 30 minutes, 47.2 g. of p-toluidine. The resulting mixture was slowly heated within 30 minutes to 180°. Then, 100 g. of zinc chloride was added to the reaction product over a period of about 30 minutes. To complete the reaction, the temperature was gradually raised within 1 hour to 225–230° and kept for 2 hours at this temperature. After the reaction mixture had cooled to 100°, 800 ml. of hot water was slowly added and the resulting mixture refluxed for 15 minutes. The hot aqueous phase was siphoned off. This extraction with hot water was repeated 3 times. The residual brown, water insoluble solid was hydrolyzed by refluxing for 6 hours with a mixture of 70 ml. of water, 100 ml. of acetic acid and 130 ml. of concentrated sulfuric acid. The resulting reaction mixture was extracted with ether and petroleum ether. The organic layers were washed 4 times with water, 3 times with 3 N sodium hydroxide and again 3 times with water. After drying over sodium sulfate, the organic extracts were concentrated in vacuo to yield crude 5-methyl-2-amino-2'-fluorobenzophenone. Crystallization from benzene-hexane afforded a pure sample, melting at 68.5–69.5° (yellow needles).

EXAMPLE 86

30.1 g. of 5-carboxy-2-acetamido-2'-fluorobenzophenone were dissolved in 300 ml. of chloroform containing 11.0 g. of triethylamine. To this a solution of 12 g. of ethylchlorocarbonate in 50 ml. of chloroform was added with stirring over a period of 1 hour at 0–5°. The reaction mixture was then stirred for 3 hours at room temperature after which gaseous ammonia was introduced at 0–5°. The mixture was kept stirring overnight at room temperature. A precipitate of 5-carbamoyl-2-acetamido-2'-fluorobenzophenone formed was collected on a funnel, washed with water and dried in vacuo at 60°. The filtrate was extracted with chloroform and washed in 3 portions with a total of 300 ml. of 1 N sodium hydroxide solution and then with water. The chloroform extract was dried over sodium sulfate and evaporated to dryness to yield an additional amount of 5-carbamoyl-2-acetamido-2'-fluorobenzophenone. After crystallization from ethanol colorless, hexagonal plates were obtained melting at 221–222°.

EXAMPLE 87

68.3 g. of the crude 5-methyl-2-amino-2'-fluorobenzophenone prepared in Example 85 above and a mixture consisting of 130 ml. of anhydrous benzene, 130 ml. of acetic anhydride and 130 ml. of pyridine was heated on the steam bath for 2 hours. Then 200 ml. of methanol was added in order to destroy the excess anhydride. This caused the reaction mixture to boil for several minutes. After evaporation of about ⅓ of the solvents the resulting solution was kept overnight at 0°. The precipitate which separated was filtered off and washed with petroleum ether. After drying in vacuo, 5-methyl-2-acetamido-2'-fluorobenzophenone was obtained and on crystallization from benzene, melted at 162–163° (almost colorless prisms).

EXAMPLE 88

A suspension of 50.0 g. of 5-methyl-2-acetamido-2'-fluorobenzophenone in a solution of 50 g. of magnesium sulfate in 2.5 liters of water, was heated to reflux. To this, 100 g. of potassium permanganate was added with vigorous stirring over a period of 5 hours. Some foaming occurred and all the reagent was used up. After allowing the resulting brown suspension to cool to about 70°, it was filtered through a suction funnel. The last traces of manganese dioxide were then removed by filtration without vacuum. Upon acidification of the clear filtrate with concentrated hydrochloric acid (Congo-red) a voluminous precipitation of 5-carboxy-2-acetamido-2'-fluorobenzophenone occurred. This was collected on a funnel, thoroughly washed with water and dried in the vacuum oven at 70°. Crystallization from methanol gave colorless needles melting at 251–252°.

EXAMPLE 89

A suspension consisting of 38.09 g. of 5-carbamoyl-2-acetamido-2'-fluorobenzophenone 380 ml. of ethylene dichloride and 38 ml. of phosphorous oxychloride was heated to reflux for 5 hours. The resulting solution was cooled and poured into 700 ml. of ice and water. The organic layer was separated and washed with water, 1 N sodium hydroxide and water, and then dried over sodium sulfate and concentrated in vacuo to dryness. The crude product was crystallized from methanol to give pale-yellow, fine needles of 5-cyano-2-acetamido-2'-fluorobenzophenone melting at 144–145°.

EXAMPLE 90

A suspension of 33.3 g. of the crude 5-cyano-2-acetamido-2'-fluorobenzophenone prepared in Example 89 above, in 333 ml. of methanol and 120 ml. of 3 N sodium hydroxide was stirred at room temperature for 2½ days. The product was filtered off, washed with water and crystallized from about 250 ml. of benzene to yield 5-cyano-2-amino-2'-fluorobenzophenone as fine, yellow needles which after crystallization from benzene, melted at 128–129°.

EXAMPLE 91

24 g. of 2-amino-5-cyano-2'-fluorobenzophenone was suspended in 200 ml. of anhydrous ether containing 7.9 ml. of pyridine. To the resulting suspension was added a solution of 25 g. of bromoacetyl bromide in 40 ml. of anhydrous ether. The addition was made at 0–5° over a period of 30 minutes. The resulting suspension was stirred for 30 minutes at 0° and then for 3 hours at 20°. The precipitate was filtered off and thoroughly washed with water and ether. After drying in vacuo at 25° the precipitate was crystallized from benzene to give 2-bromoacetamido-5-cyano-2'-fluorobenzophenone as pale yellow prisms melting at 142–143°.

EXAMPLE 92

5 g. of 2-bromoacetamido-5-cyano-2'-fluorobenzophenone was introduced into 200 ml. of liquid ammonia at reflux temperature. The resulting solution was refluxed for 6 hours at which time 200 ml. of anhydrous ether was added and the ammonia allowed to evaporate overnight. 100 ml. of water was then added and the suspension stirred for 1 hour, then filtered and the filtrate extracted with ether and washed several times with water, after which it was dried over sodium sulfate and taken to dryness in vacuo at 50°. The resulting solid was combined with the precipitate and the resulting mixture dissolved in benzene and extracted with a total of 100 ml. of 3 N hydrochloric acid. The acid extract was immediately neutralized (to about pH 8) in the cold using 3 N sodium hydroxide. The precipitate which formed was filtered off, washed several times with water, and crystallized from methanol to yield 2-aminoacetamido-5-cyano-2'-fluorobenzophenone as prisms melting at 148–149°.

EXAMPLE 93

39 g. o-chlorobenzoyl chloride was warmed to 110°. With stirring 10.7 g. of p-toluidine was added and the mixture heated to 180°. Then 20 g. of anhydrous zinc chloride was added and the temperature was raised to 220° during 1 hour. The reaction mixture was kept at 220° for another hour. After cooling to 130°, 200 ml. of water was added and the mixture heated to reflux for 5 minutes with vigorous stirring. The hot water layer was then decanted and the procedure was repeated 3 times.

The water-insoluble residue was then refluxed for 10 hours with a mixture of 25 ml. of water, 35 ml. of acetic acid and 50 ml. of concentrated sulfuric acid. The resulting dark solution was cooled, poured into ice-water and the ether extracted with ether. The ether solution was shaken with 2 N sodium hydroxide. Concentration of the dark ether solution yielded 5-methyl-2-amino-2'-chlorobenzophenone as a yellow oil which after three crystallizations from hexane melted at 106–107°.

EXAMPLE 94

A mixture of 10 g. of 5-methyl-2-amino-2'-chlorobenzophenone, 10 ml. of acetic anhydride, 5 ml. of pyridine and 100 ml. of benzene was heated to reflux for 2 hours. The solvent was removed in vacuo and the residue was crystallized twice from acetone-hexane yielding crystals of 5-methyl-2-acetylamino-2'-chlorobenzophenone melting at 158°.

EXAMPLE 95

A suspension of 10 g. of 5-methyl-2-acetylamino-2'-chlorobenzophenone in 500 ml. of water was heated to reflux. In small portions and with vigorous stirring 10 g. of potassium permanganate was added. The mixture was kept at reflux temperature for 8 hours. The hot reaction mixture was then filtered through Celite and the filtrate was acidified with 2 N hydrochloric acid. The white precipitate was filtered off, washed with water and dried in vacuo yielding 2-acetylamino-5-carboxy-2'-chlorobenzophenone as a white powder which after being crystallized three times from methylene chloride-ethanol melted at 263–265°.

EXAMPLE 96

A solution of 3.2 g. of 2-acetylamino-5-carboxy-2'-chlorobenzophenone in 50 ml. of chloroform and 1 ml. of triethylamine was treated in the cold with 1.1 g. of ethyl chlorocarbonate. The reaction mixture was stirred for 2 hours after which a vigorous stream of gaseous ammonia was introduced for ¼ hour. The mixture was kept at room temperature overnight. Then more chloroform was added to dissolve the precipitate. The chloroform solution was washed with 2 N hydrochloric acid, water, 2 N sodium hydroxide and again water, dried with sodium sulfate and concentrated to dryness, yielding white crystals of 2-acetylamino-5-carbamoyl-2'-chlorobenzophenone which upon crystallization from ethanol formed prisms melting at 216–217°.

EXAMPLE 97

6.0 ml. of phosphorous oxychloride was introduced into a solution of 5.9 g. of 2-acetylamino-5-carbamoyl-2'-chlorobenzophenone in 40 ml. of ethylene dichloride heated to 65°. After the addition had been completed, the solution was kept at 65° for another 1½ hours. Then it was poured on ice-water, the organic layer was washed neutral with sodium bicarbonate solution, then dried with sodium sulfate. After evaporation of the solvent an almost white crystalline product was obtained. Two crystallizations from ethanol yielded white needles of 2-acetylamino-5-cyano-2'-chlorobenzophenone melting at 153–154°.

EXAMPLE 98

4.3 g. of 2-acetamido-5-cyano-2'-chlorobenzophenone was dissolved in 70 ml. of hot (50°) methanol. To this hot solution 25 ml. of 30% aqueous sodium hydroxide was added. The mixture was kept at room temperature for 3 hours, diluted with water and extracted with methylene chloride. The methylene chloride solution was dried with sodium sulfate and evaporated. The residue was recrystallized from benzene forming yellowish prisms of 2-amino-5-cyano-2'-chlorobenzophenone melting at 151–152°.

EXAMPLE 99

Into a suspension of 13 g. of 2-amino-5-cyano-2'-chlorobenzophenone in 250 ml. of absolute ether was introduced at 25° 13 g. of bromoacetyl bromide. After the addition had been completed the mixture was stirred at room temperature for 5 hours. Then the yellowish precipitate was filtered off, washed with water, dried in vacuo, and the residue crystallized twice to give an analytical sample of 2-bromoacetylamino-5-cyano-2'-chlorobenzophenone melting at 158–159°.

EXAMPLE 100

14 g. of 2-bromoacetylamino-5-cyano-2'-chlorobenzophenone was added to 200 ml. of liquid ammonia. A yellow solution was formed. The ammonia was evaporated and the crystalline residue was treated with water and chloroform. The chloroform layer was extracted with 2 N hydrochloric acid. The acid extract was neutralized with dilute sodium hydroxide whereupon 2-amino-4'-cyano-2'-(o-chlorobenzoyl)-acetanilide separated as a white precipitate, which was filtered off, washed with water and dried in vacuo. After two crystallizations from acetone-hexane the compound, 2-amino-4'-cyano-2'-(o-chlorobenzoyl)-acetanilide, melted at 170–172°.

EXAMPLE 101

To a solution of 62 g. of 2-amino-2'-nitrobenzophenone in 250 ml. of dichloromethane, 27 ml. of bromoacetyl bromide was added dropwise. The solution was refluxed for 2 hours, cooled, washed with sodium bicarbonate solution, and evaporated to dryness. The residue was crystallized from benzene giving crystals of 2-(2-bromoacetamido)-2'-nitrobenzophenone melting at 157–159°.

The above mentioned 2-(2-bromoacetamido)-2'-nitrobenzophenone is not a part of this invention but its preparation is set forth above in order that this disclosure may be complete.

To a solution of 20 g. of 2-(2-bromoacetamido)-2'-nitrobenzophenone in 200 ml. of tetrahydrofuran, an excess of liquid ammonia (ca. 200 ml.) was added. The ammonia was kept refluxing for 4 hours using a Dry Ice condenser. Then the ammonia was allowed to evaporate slowly. After an over-all reaction time of 17 hours, the solution was concentrated in vacuo and poured into a sodium bicarbonate solution. The solid material was filtered off and recrystallized from alcohol yielding crystals of 2-amino-2'-(2-nitrobenzoyl)-acetanilide melting at 157–159°.

A solution of 5 g. of 2-amino-2'-(2-nitrobenzoyl) acetanilide in 50 ml. of pyridine was refluxed for 26 hours. After this time the pyridine was removed in vacuo and the residue dissolved in a boiling mixture of 9 ml. of alcohol, 45 ml. of concentrated hydrochloric acid and 45 ml. of water. Decolorizing carbon was added and after keeping the mixture on the steam bath for about 5–10 minutes all insoluble material was filtered off. The clear solution was cooled, neutralized with ammonia and extracted with a mixture of dichloromethane and ether. The organic phase was concentrated by evaporation and the residue recrystallized from benzene. Crystals of 5-(2-nitrophenyl)-3H-1,4-benzodiazepin-2(1H)-one melting at 206–208° were obtained.

EXAMPLE 102

A stirred solution of 75 g. of 2-amino-2'-nitrobenzophenone in 700 ml. of hot concentrated hydrochloric acid was cooled to 0° and a solution of 21.5 g. of sodium nitrite in 50 ml. of water was added in the course of 3 hours. The temperature of the suspension was kept at 2–7° during the addition. The resulting clear solution was poured into a stirred solution of 37 g. of cuprous chloride in 350 ml. of hydrochloric acid 1:1. The solid which had formed after a few minutes was filtered off, washed with water and recrystallized from ethanol. Crystals of 2-chloro-2'-nitrobenzophenone melting at 76–79° were obtained.

A solution of 20 g. of 2-chloro-2'-nitrobenzophenone in 450 ml. of ethanol was hydrogenated at normal pressure and room temperature with Raney nickel. After uptake of ca. 6 liters of hydrogen the catalyst was filtered off, and the alcohol then removed in vacuo. The residue was distilled in a bulb tube at 0.4 mm. and a bath temperature of 150–165° giving a yellow oil. The oil was dissolved in alcohol, and on addition of water, needles of 2-amino-2'-chlorobenzophenone melting at 58–60° were obtained.

To a solution of 42 g. of 2-amino-2'-chlorobenzophenone in 500 ml. of benzene, 19 ml. of bromoacetyl bromide was added dropwise. After refluxing for 2 hours, the solution was cooled, washed with 2 N sodium hydroxide and evaporated. The residue was recrystallized from methanol giving crystals of 2-bromo-2'-(2-chlorobenzoyl)-acetanilide melting at 119–121°.

The 2-bromo-2'-(2-chlorobenzoyl)-acetanilide mentioned above is not a part of this invention but intermediates therefor and its preparation are set forth above in order that this disclosure may be complete.

To a solution of 14.5 g. of 2-bromo-2'-(2-chlorobenzoyl)-acetanilide in 100 ml. of tetrahydrofuran, an excess of liquid ammonia (ca. 150 ml.) was added. The ammonia was kept refluxing with a Dry Ice condenser for 3 hours after which time the ammonia was allowed to evaporate and the solution was poured into water. Crystals of 2-amino-2'-(2-chlorobenzoyl)-acetanilide were collected, which after recrystallization from ethanol melted at 162–164°.

A solution of 3 g. of 2-amino-2'-(2-chlorobenzoyl)-acetanilide in 50 ml. of pyridine was refluxed for 24 hours after which time the pyridine was removed in vacuo. The residue was recrystallized from methanol and a mixture of dichloromethane and ether giving crystals of 5-(2-chlorophenyl)-3H-1,4-benzodiazepin-2(1H)-one melting at 212–213°.

EXAMPLE 103

A solution of 10.7 g. of 2-amino-5-fluorobenzophenone and 4.7 ml. of bromoacetyl bromide in 100 ml. benzene was stirred for one half hour while about 100 g. of ice was added in portions as to keep the temperature at around 10–15°. The organic layer was separated, washed with dilute ammonium hydroxide, dried, and concentrated in vacuo to a small volume. Petroleum ether was added to the concentrate, which was then filtered. After recrystallization of the precipitate from ether it formed colorless prisms of 2-bromoacetamido-5-fluorobenzophenone melting at 103–105°.

The 2-bromoacetamido-5-fluorobenzophenone mentioned above is not a part of this invention but its preparation is set forth above in order that the present disclosure may be complete.

A solution of 20.5 g. of 2-bromoacetamido-5-fluorobenzophenone in ca. 300 ml. of liquid ammonia was stirred at reflux temperature for 5 hours until the ammonia had evaporated. The residue was dissolved in cold dry hydrochloric acid and filtered. The filtrate was made alkaline with ammonium hydroxide, the crude crystalline 2-aminoacetamido-5-fluorobenzophenone filtered off, dissolved in methanol, and an excess of methanolic hydrogen chloride then added thereto. The resulting hydrochloride salt was precipitated by the addition of ether and petroleum ether and filtered off. After a recrystallization from methanol and ether it formed long yellow prisms melting at 242–243°.

A solution of 13 g. of crude 2-aminoacetamido-5-fluorobenzophenone in 200 ml. of ethanol was refluxed for 1.5 hours, concentrated in vacuo to a small volume, ether added, and 7-fluoro-5-phenyl-3H-1,4-benzodiazepin-2(1H)-one filtered off as the crystalline reaction product. After crystallization from a mixture of ether and petroleum ether the product melted at 197–198°.

EXAMPLE 104

To a stirred solution of 39.9 g. of 2-amino-5-chloro-4'-chloro-benzophenone in 300 ml. of benzene were added in portions 18.7 ml. of bromoacetyl bromide and ice keeping the temperature at about 10–15°. After 30 minutes the organic layer was separated, washed with dilute ammonium hydroxide, dried and concentrated in vacuo to a small volume. Ether was added to the concentrate and crude reaction product was filtered off. After recrystallization from a mixture of benzene and ether it formed colorless prisms of 2-bromoacetamido-5-chloro-4'-chlorobenzophenone melting at 127–128°.

The 2-bromo-acetamido-5-chloro - 4' - chlorobenzophenone mentioned above is not a part of this invention but its preparation is set forth above in order that the present disclosure may be complete.

A solution of 39.5 g. of 2-bromoacetamido-5-chloro-4'-chlorobenzophenone in about 300 ml. of liquid ammonia was stirred at reflux temperature for 2 hours and then left at room temperature for 9 hours until the ammonia had evaporated. The residue was taken up in methylene chloride and water. The organic layer was separated, dried and concentrated in vacuo to a small volume. Petroleum ether was added to the concentrate and crude reaction product filtered off. After recrystallization from a mixture of methylene chloride and petroleum ether it formed colorless prisms of 2-aminoacetamido-5-chloro-4'-chlorobenzophenone melting at 139–140°.

A solution of 10 g. of 2-aminoacetamido-5-chloro-4'-chlorobenzophenone in 50 cc. pyridine was refluxed for 16 hours and then concentrated in vacuo to dryness. The residue was dissolved in ethanol, treated with carbon, filtered and the filtrate concentrated in vacuo to a small volume. The crude reaction product crystallized out and was filtered off. After recrystallization from ethanol it formed colorless prisms of 7-chloro-5-(p-chlorophenyl)-3H-1,4-benzodiazepin-2(1H)-one melting at 247–248°.

EXAMPLE 105

A solution of 20 g. of 2-bromo-4'-chloro-2'-(2-fluorobenzoyl)-acetanilide in 600 ml. of tetrahydrofuran was saturated at room temperature with methylamine gas. The mixture was then stirred for one hour and concentrated under reduced pressure. The mixture of reaction product and methylammonium bromide was partitioned between methylene chloride and water (300 ml.: 300 ml.), the organic layer was then separated, washed with water (5×300 ml.), dried over anhydrous sodium sulfate, filtered and concentrated to an oil. The product was crystallized from an ether, petroleum ether (B.P. 30–40°) mixture yielding 4'-chloro-2-(2-fluorobenzoyl)-2-methylaminoacetanilide as pale yellow prisms melting at 85–86°.

EXAMPLE 106

A solution of 28.7 g. of 2-bromo-4'-chloro-2'-(2-fluorobenzoyl) acetanilide in 800 ml. of tetrahydrofuran was treated with dimethylamine gas and worked up as described in example 105. The product was recrystallized from hexane yielding 4'-chloro-2-dimethylamino-2'-(2-fluorobenzoyl) acetanilide as yellow prisms melting at 77–78°.

EXAMPLE 107

To a stirred solution of 19 g. of 2-amino-2'-trifluoromethyl-benzophenone in 200 cc. of acetic acid cooled in an ice bath to about 10°, a solution of 11.46 g. of bromine in 75 cc. of acetic acid was added dropwise over a period of ten minutes. After the addition had been completed the mixture was allowed to stir for an additional five minutes at 10° and then the cooling bath was removed and the reaction mixture allowed to reach room temperature over a period of 20 minutes. A white hydrobromide salt precipitated and was filtered off, washed with 100 cc. of ether, dissolved in water and made alkaline with ammonium hydroxide. The product was then extracted with methylene chloride (3× 50 cc.). The organic layers were combined, dried over anhydrous sodium sulfate, filtered and the solvent removed to give 2-amino-5-bromo-2'-trifluoromethyl benzophenone which upon recrystallization from ethanol formed yellow needles melting at 93–94°. A further crop of product was obtained by extracting the acetic acid filtrate with methylene chloride (4× 50 cc.), washing the combined extracts with ammonium hydroxide (2× 50 cc.), water (3× 50 cc.), drying over anhydrous sodium sulfate, filtering, removal of the solvent and recrystallization of the residue from ethanol.

The same product could also be obtained by converting 35 g. of o-chlorobenzotrifluoride to the Grignard reagent in the usual way with 4.63 g. of magnesium and 30 cc. of dry tetrahydrofuran diluted with 100 cc. of ether. The solution was then added dropwise under nitrogen with cooling and stirring to 30 g. of 6-bromo-2-methyl-4H-3,1-benzoxazin-4-one dissolved in 200 cc. of dry toluene. The resulting solution was stirred for 1 hour at room temperature, then refluxed for 1 hour, cooled in an ice bath and the Grignard complex decomposed with 36 cc. of 5 N hydrochloric acid. The mixture was then washed with water, ammonium chloride solution, and finally with aqueous ammonia. The organic layer was separated, concentrated in vacuo and the residue refluxed for 1 hour with a mixture of 50 cc. of concentrated hydrochloric acid in 50 cc. of ethanol. Then the solvents were distilled off and the residue treated with 20 cc. of water whereupon a solid separated. After drying, it was crystallized from hexane yielding 2-amino-5-bromo-2'-trifluoromethyl-benzophenone melting at 92–94°.

A solution of 21.9 g. of 2-amino-5-bromo-2'-trifluoromethyl benzophenone was dissolved in 250 cc. of ether and treated with 13.8 g. of bromoacetyl bromide. After the addition the mixture was stirred for 1 hour and the solvent removed. The residue was crystallized from methanol yielding 5 - bromo - 2-bromoacetamido-2'-trifluoromethyl-benzophenone as white prisms melting at 140.5–141.5°.

The 5-bromo-2-bromoacetamido-2'-trifluoromethyl-benzophenone mentioned above is not a part of this invention but its preparation and intermediates therefore are set forth above in order that the present disclosure may be complete.

26.4 g. of 5 - bromo - 2 - bromoacetamido - 2' - trifluoromethylbenzophenone was added to 750 cc. of liquid ammonia and the mixture was warmed gently on the steam bath to facilitate evaporation of the ammonia. The residue was then partitioned between 200 cc. of methylene chloride and 300 cc. of water. The layers were separated and the organic layer washed with water (3× 50 cc.), saturated brine (3× 25 cc.), dried over anhydrous sodium sulfate, filtered, and evaporated to dryness. Recrystallization of the residue from acetone gave 5-bromo-2-aminoacetamido 2'-trifluoromethyl-benzophenone, as a crystalline material, and an oily residue. The crude aminoacetamido compound was not further purified but was recombined with the residue, dissolved in a mixture of 1200 cc. of pyridine and 100 cc. of benzene, and refluxed using a fractionating column equipped with a Dean-Stark head. Water, formed in the cyclization, was removed by azeotropic distillation. After the theoretical amount of water had been collected (36 hours), the pyridine/benzene solution was evaporated under reduced pressure to yield 7-bromo-5-(a,a,a-trifluoro orthotolyl)-3H-1,4-benzodiazepin-2(1H)-one, which upon recrystallization from acetone/hexane formed white prisms melting at 183–185°.

EXAMPLE 108

A solution of 3.8 g. of 2-aminobenzophenone and 4.0 g. of carbobenzoxyglycine in 150 cc. of methylene chloride was cooled to 0° and 4.0 g. of N,N'-dicyclohexylcarbodiimide was added in four portions at 30 minute intervals. After stirring for 6 hours in an ice bath, the reaction mixture was kept overnight at room temperature, then stirred for 20 minutes after the addition of 4 cc. of acetic acid. Dicyclohexylurea was filtered off and the filtrate washed with dilute sodium bicarbonate. Following drying over sodium sulfate, solvent was distilled off in vacuo. The residue was crystallized from a mixture of benzene and hexane to give (2-benzoylphenylcarbamoylmethyl)carbamic acid benzyl ester which upon being twice crystallized from benzene-hexane melted at 116–117°.

A solution of 4.5 g. of (2-benzoylphenylcarbamoylmethyl) carbamic acid benzyl ester in 45 cc. of 20 percent hydrobromic acid in acetic acid was stirred for 30 minutes at room temperature. Anhydrous ether (175 cc.) was then added. After pouring off the supernatant, the residue was stirred with water and ether, cooled in an ice bath, and made slightly alkaline with ammonia. The ether layer was dried over sodium sulfate, filtered; some benzene added and the resulting solution concentrated in vacuo to a small volume. On addition of hexane to the residue, 2-glycylaminobenzophenone crystallized and upon recrystallization from benzene and hexane, melted at 76–77°.

The (2-benzoylphenylcarbamoylmethyl) carbamic acid benzyl ester mentioned above, and the method for preparing 2-glycylaminobenzophenone therefrom are not a part of the present invention, but such are disclosed herein in order that the present disclosure may be complete.

EXAMPLE 109

36 g. of 2-amino-2'-chlorobenzophenone, 100 cc. of methanol and 42 g. of sodium thiocyanate is vigorously stirred in a 0.5 l., three-neck flask. 9.5 cc. of bromine dissolved in 35 cc. of cold methanol (saturated with NaBr) are added dropwise thereto at a temperature not exceeding 0°. The mixture is then stirred for ½ hour at 0° to 5° and the reaction mass then poured into 2500 cc. of water and neutralized with 20% sodium carbonate solution. The precipitate is filtered off by suction, washed with cold water, recrystallized from acetonitrile, water and ethanol yielding 5-thiocyano-2 - amino - 2' - chlorobenzophenone melting at 117–119°.

47 g. of 5-thiocyano-2-amino-2'-chlorobenzophenone is dissolved in 200 cc. of alcohol at 50° in a 1 l., 3-neck flask. 250 cc. of sodium hydroxide (10%) and 55 g. of sodium hydrosulfite are then added thereto, and the resulting mixture is heated to 80°. After cooling to 40°, 20 cc. of dimethylsulfate is added dropwise and the mixture stirred for 1 hour at room temperature. The alcohol is then distilled off and the residue extracted with dichloromethane. Concentration in vacuo yielded 5-methylmercapto-2-amino-2'-chlorobenzophenone.

30 g. of the crude 5-methylmercapto-2-amino-2'-chlorobenzophenone are dissolved in 320 cc. of benzene and 320 cc. of ether. The resulting solution is chilled to 0°, 33 g. of bromoacetyl bromide is added dropwise and then 50 g. of ice. After 10 minutes a diazo-test with R-salt was negative. 100 cc. of water was then added, the resulting mixture was filtered through a fritted funnel, and separated. The benzene-ether layer is extracted with water and ammonium hydroxide then washed neutral with water. The benzene-ether solution is then dried with sodium sulfate and concentrated. The resulting oil is crystallized from benzene and petroleum ether yielding 2-bromoacetamido-5-methylmercapto - 2' - chlorobenzophenone, which upon recrystallization from methylene chloride and petroleum ether melted at 106–108°.

21 g. of 2 - bromoacetamido - 5 - methylmercapto - 2''-chlorobenzophenone are mixed with about 100 cc. of liquid ammonia. After about 5 hours, the ammonia is evaporated and the residue treated with a mixture of water and methylene chloride. The organic layer containing the formed 5-methylmercapto-2'-chloro - 2 - aminoacetamidobenzophenone is separated, concentrated in vacuo, and the residue dissolved in a mixture of 200 cc. of alcohol and 50 cc. of pyridine, and refluxed for 16 hours. The solution is concentrated in vacuo, the residue diluted with water, and the precipitate filtered off, yielding, upon two recrystallizations from ethanol, 7-methylmercapto-5-(2'-chlorophenyl)-3H-1,4-benzodiazepine - 2(1H) - one melting at 221–223°.

The above mentioned 2-bromoacetamido-5-methylmercapto-2'-chlorobenzophenone is not a part of this invention, but the preparation thereof and the intermediates therefor are set forth above in order that the present disclosure may be complete.

EXAMPLE 110

79.5 g. of 2'-trifluoromethyl-2-aminobenzophenone, 80 g. of sodium thiocyanate and 200 cc. of methanol are reacted at 0° with 19 cc. of bromine in 70 cc. of methanol saturated with sodium bromide. The reaction mixture is stirred for one half hour at 0° to 5° and the reaction mass then poured into 2,000 cc. of water and neutralized with 220 cc. of 20% sodium carbonate solution. The resultant precipitate is filtered off by suction, washed with cold water and recrystallized from ethanol yielding crystals of 5-thiocyano-2' - trifluoromethyl - 2 - aminobenzophenone melting at 117–118°.

90 g. of 5-thiocyano-2'-trifluoromethyl-2-aminobenzophenone, and 400 cc. of alcohol are heated to 50°, whereupon 110 g. of sodium hydrosulfite and 500 cc. of 10% sodium hydroxide are added, and the resulting mixture heated to 80°. After cooling to 40°, 40 cc. of dimethyl sulfate is added dropwise and the resulting mixture is stirred for one hour at room temperature. The alcohol is then distilled off and the residue diluted with 1400 cc. of water and extracted with dichloromethane. The dichloromethane extract is concentrated in vacuo, yielding 5-methylmercapto-2'-trifluoromethyl-2 - amino benzophenone as a heavy oil.

To a mixture of 64 g. of 5-methylmercapto-2'-trifluoromethyl-2-aminobenzophenone, 300 cc. of benzene, 100 cc. of ether and 30 g. of ice is added 45 g. of bromoacetyl bromide at 0° to 5° (diazo-test was negative). After 15 minutes of stirring, 200 cc. of ice water is added thereto and the resulting mixture separated. The organic layer is washed with water and dilute ammonia, dried over sodium sulfate and concentrated in vacuo. Addition of petroleum ether yields crystals of 5-methylmercapto-2' - trifluoromethyl-2 - bromoacetylaminobenzophenone which, upon being recrystallized from methylene chloride and petroleum ether, melted at 104–5°.

60 g. of 5 - methylmercapto - 2' - trifluoromethyl - 2 - bromoacetylaminobenzophene was stirred with about 300 cc. of liquid ammonia for 5 hours. After evaporation of the ammonia, 500 cc. of dichloromethane and 300 cc. of water were added to the residue, and the resulting mixture stirred for 30 minutes. The organic layer was then separated, dried over sodium sulfate and concentrated in vacuo, yielding 5-methylmercapto-2'-trifluoromethyl-2-amino-acetamidobenzophenone, which upon being crystallized from benzene/petroleum ether melted at 77–78°.

20 g. of 5 - methylmercapto - 2' - trifluoromethyl - 2 - aminoacetamidobenzophenone was refluxed 20 hours in 200 cc. of pyridine and then concentrated in vacuo. Ether was added and the resulting solid filtered off, yielding 7-methylmercapto - 5 - o - trifluoromethylphenyl-3H-1,4-benzodiazepin-2(1H)-one, which, upon recrystallization from benzene, melted at 199–200°.

The above mentioned 5 - methylmercapto - 2'- trifluoromethyl-2-bromoacetylaminobenzophene is not a part of this invention, but the preparation thereof and intermediates therefor are set forth above in order that the present disclosure may be complete.

We claim:
1. A compound selected from the group consisting of compounds of the formula

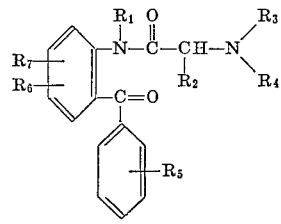

their pharmaceutically acceptable acid addition salts, benzyl and lower alkyl quaternary ammonium salts; wherein $R_1$, $R_2$, $R_3$ and $R_4$ are chosen from the group consisting of hydrogen and lower alkyl; $R_5$, $R_6$ and $R_7$ are chosen from the group consisting of hydrogen, halogen, lower alkyl, lower alkoxy, hydroxy, nitro, cyano, trifluoromethyl, lower alkyl-thio, and mercapto.

2. A compound of the formula

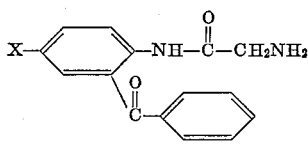

wherein X is selected from the group consisting of hydrogen and chlorine.

3. A compound of the formula

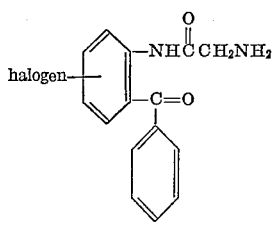

4. A pharmaceutically acceptable acid-addition salt of a compound of claim 3.

5. A compound of the formula

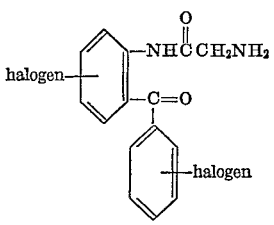

6. A pharmaceutically acceptable acid-addition salt of a compound of claim 5.

7. A compound of the formula

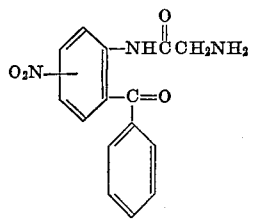

8. A pharmaceutically acceptable acid-addition salt of a compound of claim 7.

9. A compound of the formula

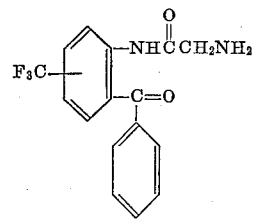

10. A pharmaceutically acceptable acid-addition salt of a compound of claim 9.

11. 2-(aminoacetamido)-5-chlorobenzophenone.
12. 2-(aminoacetamido)-5-chlorobenzophenone hydrochloride.
13. 2-(aminoacetamido)-5-nitrobenzophenone.
14. 2-(aminoacetamido) - 5 - nitrobenzophenone hydrochloride.
15. 2 - (aminoacetamido) - 5 - trifluoromethylbenzophenone.
16. 2-(aminoacetamido)-5-cyanobenzophenone.

References Cited

UNITED STATES PATENTS

| 3,121,076 | 2/1964 | Keller et al. | 260—562 X |
| 3,121,114 | 2/1964 | Keller et al. | 260—562 X |
| 3,136,815 | 6/1964 | Reeder et al | 260—562 X |

FOREIGN PATENTS 75,915 2/1893 Germany.

OTHER REFERENCES

Jacobs et al., Journal of American Chemical Society, 1919, vol. 41, p. 469.

Hill et al., Jour. Am. Chem. Soc., vol. 44, p. 2359, 1922.

HENRY R. JILES, Primary Examiner

NATALIE TROUNCE, Assistant Examiner

U.S. Cl. X.R.

260—141, 239.3, 244, 454, 471, 501.11, 501.12, 501.15, 518, 544, 558, 562, 566, 570, 591, 999